United States Patent
Chawla et al.

(10) Patent No.: US 12,443,414 B2
(45) Date of Patent: Oct. 14, 2025

(54) SYSTEM AND METHOD TO STATISTICALLY DETERMINE AND RECOMMEND BOUNCE-ABLE MACHINES TO IMPROVE USER EXPERIENCE

(71) Applicant: Citrix Systems, Inc., Fort Lauderdale, FL (US)

(72) Inventors: Prabhjeet Singh Chawla, Kanpur (IN); Vindhya Gajanan, Bengaluru (IN); Rahul Gupta, Bengaluru (IN)

( * ) Notice: Subject to any disclaimer, the term of this patent is extended or adjusted under 35 U.S.C. 154(b) by 853 days.

(21) Appl. No.: 17/500,409

(22) Filed: Oct. 13, 2021

(65) Prior Publication Data
US 2023/0114867 A1   Apr. 13, 2023

(51) Int. Cl.
G06F 9/4401 (2018.01)

(52) U.S. Cl.
CPC .................. *G06F 9/4403* (2013.01)

(58) Field of Classification Search
CPC ...................................................... G06F 9/4403
See application file for complete search history.

(56) References Cited

U.S. PATENT DOCUMENTS

| | | | |
|---|---|---|---|
| 2015/0149393 A1* | 5/2015 | Hwang | G06N 20/00 706/12 |
| 2022/0171647 A1* | 6/2022 | Mutha | H04L 41/0816 |

* cited by examiner

Primary Examiner — Gary Collins

(57) ABSTRACT

Described embodiments provide systems and methods for determining bounce-able machines. One or more processors can be coupled to memory. The one or more processors can identify data associated with a history of actions performed on a plurality of machines. The one or more processors can determine, using the data, a change in performance of the plurality of machines if a sequence of actions were applied to one or more of the plurality of machines. The one or more processors can select a machine of the plurality of machines based on at least on the change in performance of the machine satisfying a threshold. The one or more processors can initiate, responsive to the selection, the sequence of actions on the machine.

20 Claims, 15 Drawing Sheets

SYSTEM AND METHOD TO STATISTICALLY DETERMINE AND RECOMMEND BOUNCE-ABLE MACHINES TO IMPROVE USER EXPERIENCE

FIELD OF THE DISCLOSURE

The present application generally relates to managing conditions of machines, including but not limited to systems and methods for determining bounce-able machines.

BACKGROUND

Client devices can communicate with servers via established communication channels. The user of the client device can be assigned a machine executing on the server. The client device can establish a session with the assigned machine. The client device can access a virtual desktop or applications via the established session with the machine. An administrator can perform maintenance on or control the machines executing on the servers.

SUMMARY

Client devices can establish sessions with virtual machines executing on servers or other computing devices. The user of the client device may perform login actions to access an application or desktop provided by the virtual machine. The virtual machine can distribute resources to multiple sessions established with the client devices. However, due to the large number of machines that are executing on the servers to provide application or desktop sessions to client devices, it can be challenging to determine which machines are performing poorly, let alone identify performance degradation of each of the machines, the state of each machine, or issues associated with a session of each user. For example, manually identifying one or more machines for which to perform remedial actions can be inefficient, resource-intensive, and time-consuming, thereby causing a delay in resolving performance issues and extended performance degradation of a session.

Systems and methods of this technical solution can provide a list of machines (e.g., bounce-able machines or session(s) of the machine) configured to perform a sequence of actions. The systems and methods can process historical data of individual machines including actions taken by the administrator on the machines. The actions can be a bounce action (e.g., the sequence of actions) to restore one or more machines to an operational state. The systems and methods can identify machines with low (or fair) performance. The systems and methods can perform a simulation to determine the improvement to the performance of individual machines based on performing the bounce action on the low-performance or fair-performance machines. The systems and methods can correlate the improvement to the performance with an improvement to the user experience (UX) of individual users by taking one or more actions on the machine.

Hence, the systems and methods can provide a list of machines and one or more actions to take on the machines to improve the performance of the machines. Each action can be associated with an improvement to the performance of individual machines. Thus, systems and methods of this technical solution can improve the performance of individual machines, restore operations of the machine, reduce resource consumption, traffic, or bandwidth between client devices and servers (e.g., ticket or communication), reduce launch failures, and improve UX connecting to or using the machines.

In one aspect, this disclosure is directed to a method for determining bounce-able machines. The method can include identifying, by one or more processors coupled to memory, data associated with a history of actions performed on a plurality of machines. The method can include determining, by the one or more processors using the data, a change in performance of the plurality of machines if a sequence of actions were applied to one or more of the plurality of machines. The method can include selecting, by the one or more processors, a machine of the plurality of machines based on at least on the change in performance of the machine satisfying a threshold. The method can include initiating, by the one or more processors responsive to the selection, the sequence of actions on the machine.

The method can include determining, by the one or more processors, a second change in performance of the machine subsequent to initiation of the sequence of actions. The method can include receiving, by the one or more processors, feedback from the machine. The method can include updating, by the one or more processors, the data associated with the plurality of machines based on the second change in performance and the feedback. The method can include generating, by the one or more processors, a list comprising one or more machines of the plurality of machines based on the change in performance of the one or more machines satisfying the threshold. The method can include selecting, by the one or more processors, at least one machine from the list.

The method can include updating, by the one or more processors, the list comprising the one or more machines subsequent to initiation of the sequence of actions on the machine. The method can include selecting, by the one or more processors, a second machine from the updated list. The method can include initiating, by the one or more processors responsive to the selection of the second machine, the sequence of actions on the second machine.

The method can include receiving, by the one or more processors, feedback data from a remote device subsequent to initiating the sequence of actions. The method can include generating, by the one or more processors, a rule set for the plurality of machines based on the feedback data from the remote device. The method can include selecting, by the one or more processors, a second machine of the plurality of machines based on the change in performance of the second machine satisfying the threshold and the rule set. The method can include initiating, by the one or more processors responsive to the selection of the second machine, a second sequence of actions on the second machine based at least on the rule set, the second sequence of actions different from the sequence of actions.

The sequence of actions can include switching, by the one or more processors, a state of the machine to maintenance mode. The sequence of actions an include terminating, by the one or more processors, one or more sessions established on the machine. The sequence of actions can include executing, by the one or more processors, a reboot on the machine. The method can include identifying, by the one or more processors using the data associated with the history of actions performed on the plurality of machines, a second machine having an inoperative state, the inoperative state comprising at least one of an unknown state, an invalid state, or a stale state. The method can include determining, by the one or more processors based on the data associated with the history of actions, that the sequence of actions restore the second machine to an operable state. The method can include initiating, by the one or more processors in response to the determination, the sequence of actions on the second machine.

The sequence of actions can include disabling, by the one or more processors, maintenance mode of the machine. The sequence of actions can include initiating, by the one or more processors, a power action on the machine. The sequence of actions can include enabling, by the one or more processors, a session sharing mode for the machine. The sequence of actions can include terminating, by the one or more processors, a session of the machine. The sequence of actions can include initiating, by the one or more processors, a reboot on the machine.

To determine the change in performance, the method can include determining, by the one or more processors, the change in performance of the plurality of machines responsive to the sequence of actions on the one or more of the plurality of machines. The method can include determining, by the one or more processors, a second change in performance of the plurality of machines responsive to a second sequence of actions on the one or more of the plurality of machines. The method can include determining, by the one or more processors, that at least one of the change in performance or the second change in performance of the one or more of the plurality of machines satisfy the threshold. The method can include selecting, by the one or more processors, the machine and a second machine of the plurality of machines based at least on the change in performance or the second change in performance of the machine and the second machine satisfying the threshold.

The method can include determining, by the one or more processors, that the change in performance is greater than the second change in performance on the machine. The method can include initiating, by the one or more processors responsive to the determination, the sequence of actions on the machine. The method can include determining, by the one or more processors, that the second change in performance is greater than the change in performance on the second machine. The method can include initiating, by the one or more processors responsive to the determination, the second sequence of actions on the second machine.

The method can include determining, by the one or more processors using the data associated with the plurality of machines, a timeframe that performance of at least one of the plurality of machines is below a second threshold. The method can include initiating, by the one or more processors responsive to the determination, the sequence of actions on the at least one of the plurality of machines prior to or during the timeframe. The data can include at least one of central processing unit (CPU), random-access memory (RAM), disk usage, resource spikes, process, load evaluator index, session count, state, or status of each of the plurality of machines. The method can include generating, by the one or more processors, a metric using the data associated with the plurality of machines. The method can include determining, by the one or more processors using the metric, the change in performance of the plurality of machines responsive to the sequence of actions on the one or more of the plurality of machines.

In another aspect, this disclosure is directed to a system for determining bounce-able machines. The system can include one or more processors coupled to memory. The one or more processors can identify data associated with a history of actions performed on a plurality of machines. The one or more processors can determine, using the data, a change in performance of the plurality of machines if a sequence of actions were applied to one or more of the plurality of machines. The one or more processors can select a machine of the plurality of machines based on at least on the change in performance of the machine satisfying a threshold. The one or more processors can initiate, responsive to the selection, the sequence of actions on the machine.

The one or more processors can determine a second change in performance of the machine subsequent to initiation of the sequence of actions. The one or more processors can receive feedback data from the machine. The one or more processors can update the data associated with the plurality of machines based on the second change in performance and the feedback data. The one or more processors can receive feedback data from a remote device subsequent to initiation of the sequence of actions. The one or more processors can generate a rule set for the plurality of machines based on the feedback data from the remote device. The one or more processors can select a second machine of the plurality of machines based on the change in performance of the second machine satisfying the threshold and the rule set. The one or more processors can initiate, responsive to the selection of the second machine, a second sequence of actions on the second machine based on the rule set, the second sequence of actions different from the sequence of actions.

Responsive to initiation of the sequence of actions, the one or more processors can switch a state of the machine to maintenance mode. The one or more processors can terminate one or more sessions established on the machine. The one or more processors can execute a reboot on the machine. The sequence of actions can include the one or more processors can disable maintenance mode of the machine. The one or more processors can initiate a power action on the machine. The one or more processors can enable a session sharing mode for the machine. The one or more processors can terminate a session of the machine. The one or more processors can initiate a reboot on the machine.

The data can include at least one of central processing unit (CPU), random-access memory (RAM), disk usage, resource spikes, process, load evaluator index, session count, state, or status of each of the plurality of machines. The one or more processors can generate a metric using the data associated with the plurality of machines. To determine the change in performance, the one or more processors can determine, using the metric, the change in performance of the plurality of machines responsive to the sequence of actions on the one or more of the plurality of machines.

In another aspect, this disclosure is directed to a non-transitory computer readable storage medium storing instructions for determining bounce-able machines. The instructions, when executed by one or more processors, can cause the one or more processors to identify data associated with a history of actions performed on a plurality of machines. The one or more processors can determine, using the data, a change in performance of the plurality of machines if a sequence of actions were applied to one or more of the plurality of machines. The one or more processors can select a machine of the plurality of machines based on at least on the change in performance of the machine satisfying a threshold. The one or more processors can initiate, responsive to the selection, the sequence of actions on the machine.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 9:
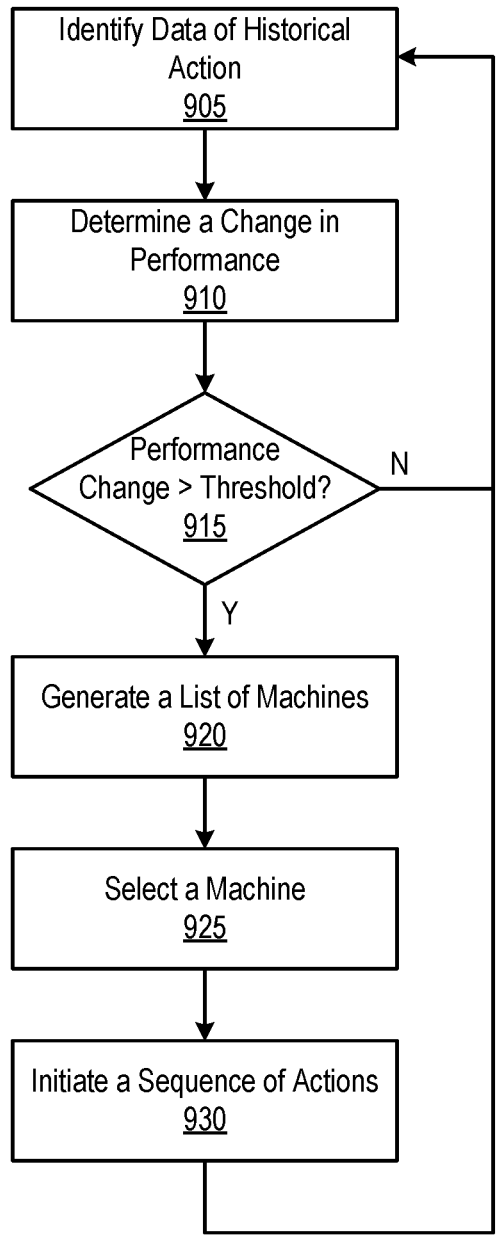
Figure 10:
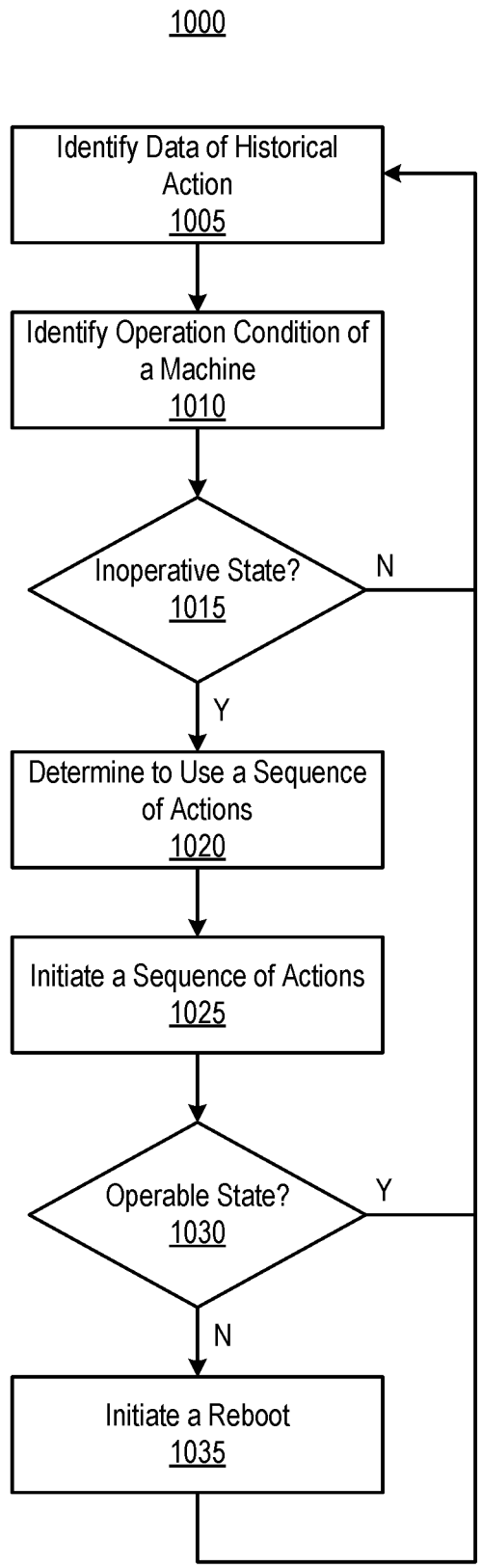

FIGS. 8A-D are examples of historical data for detecting unavailable VDI, in accordance with one or more implementations;

FIG. 9 is an example flow diagram of a method for determining bounce-able machines, in accordance with one or more implementations; and FIG. 10 is an example flow diagram of a method for detecting unavailable VDI, in accordance with one or more implementations.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for determining bounce-able machines.

A. Computing Environment

Prior to discussing the specifics of embodiments of the systems and methods of an appliance and/or client, it may be helpful to discuss the computing environments in which such embodiments may be deployed.

Figure 1A:
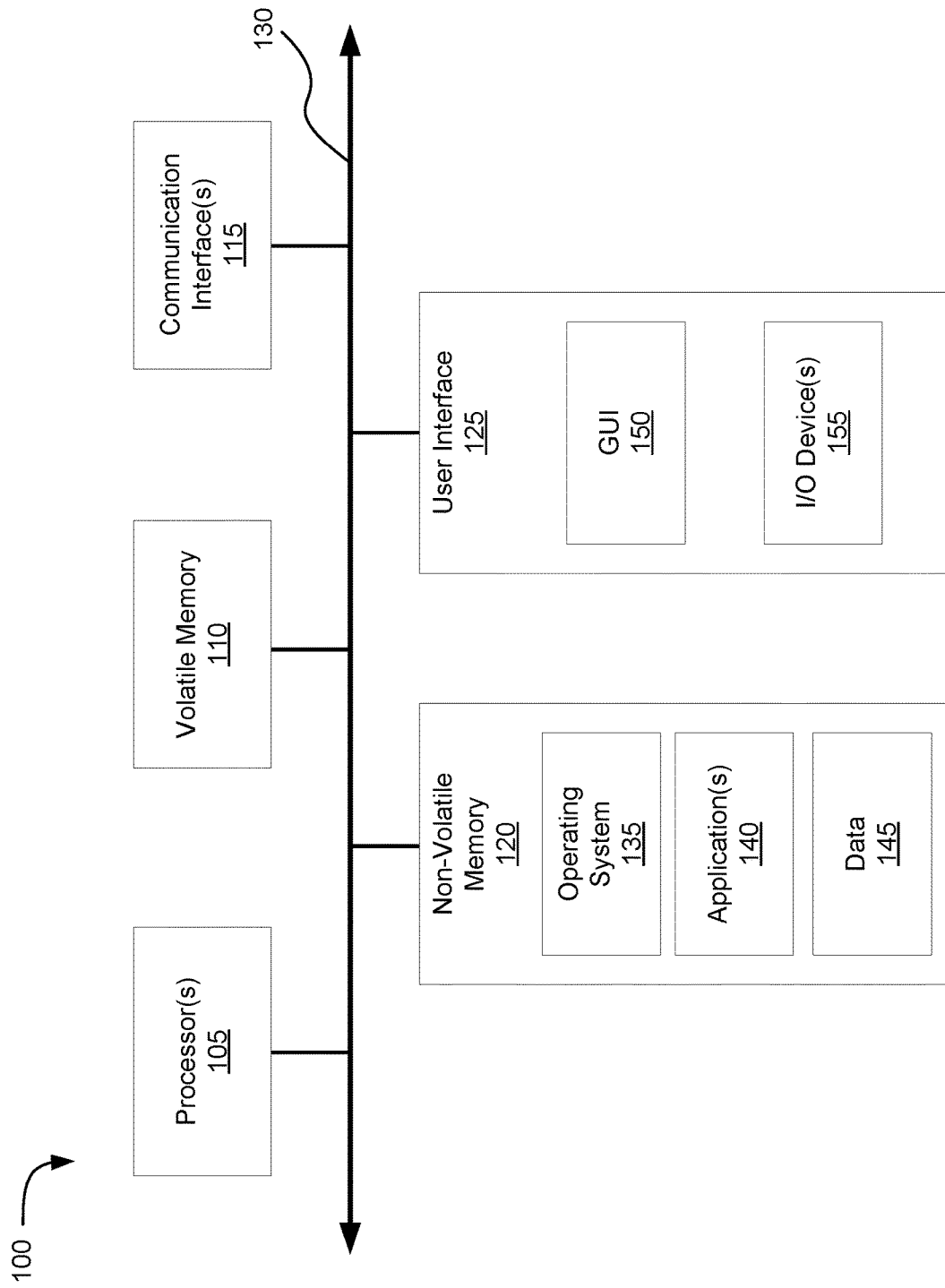
FIG. 1A is a block diagram of embodiments of a computing device.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
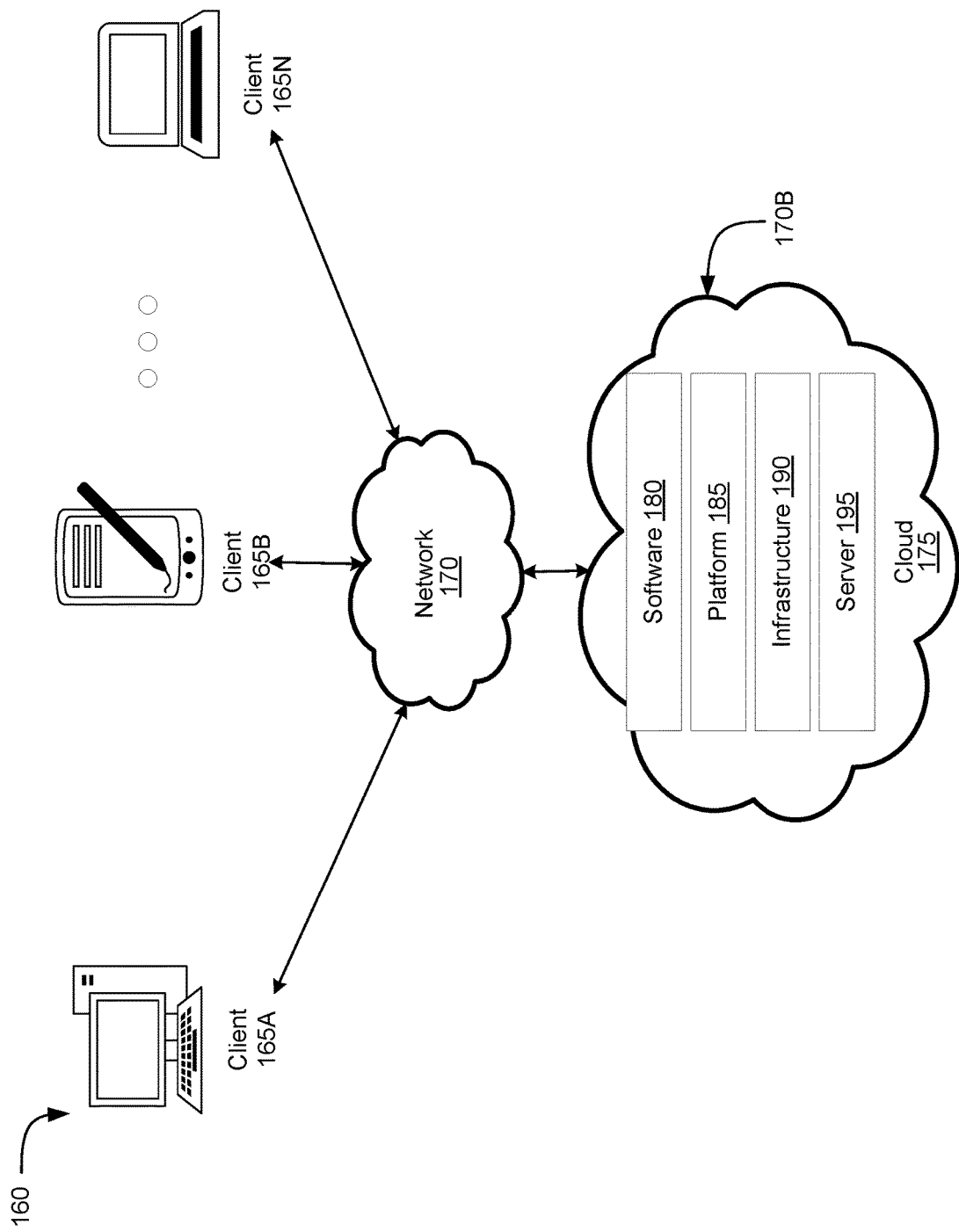
FIG. 1B is a block diagram depicting a computing environment comprising client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
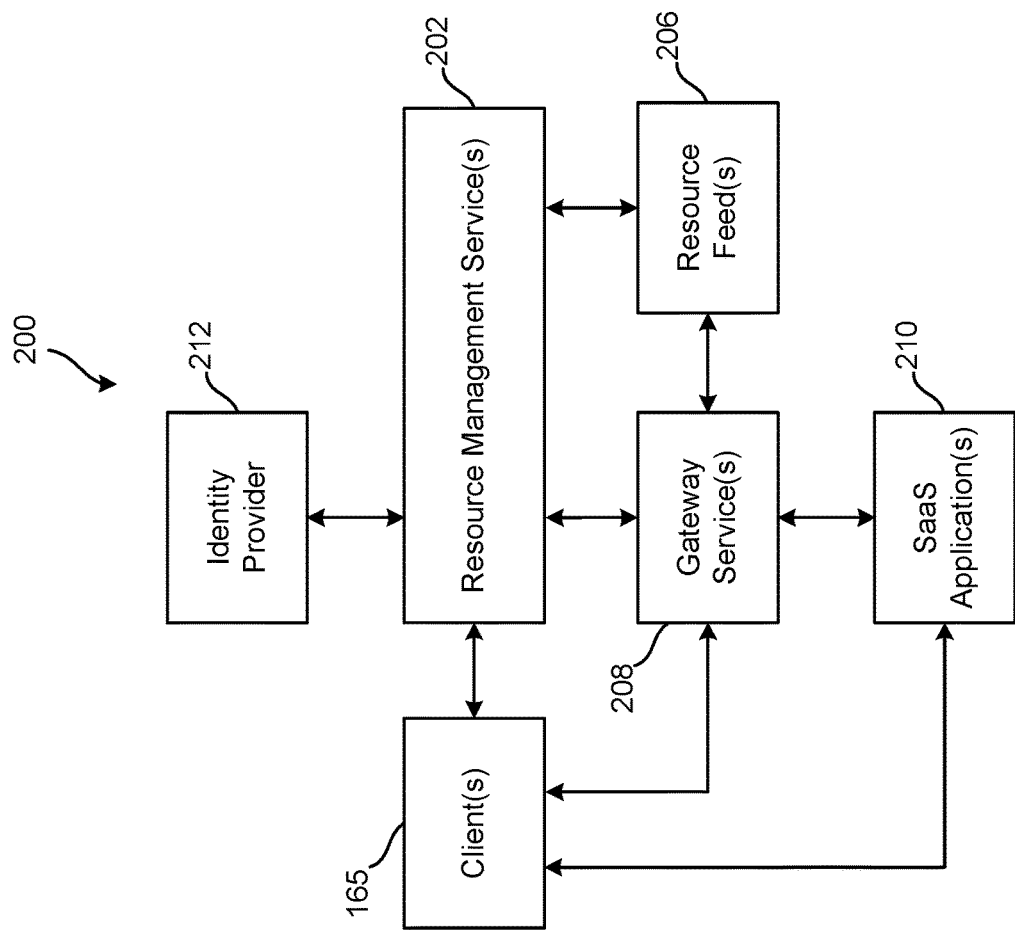
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
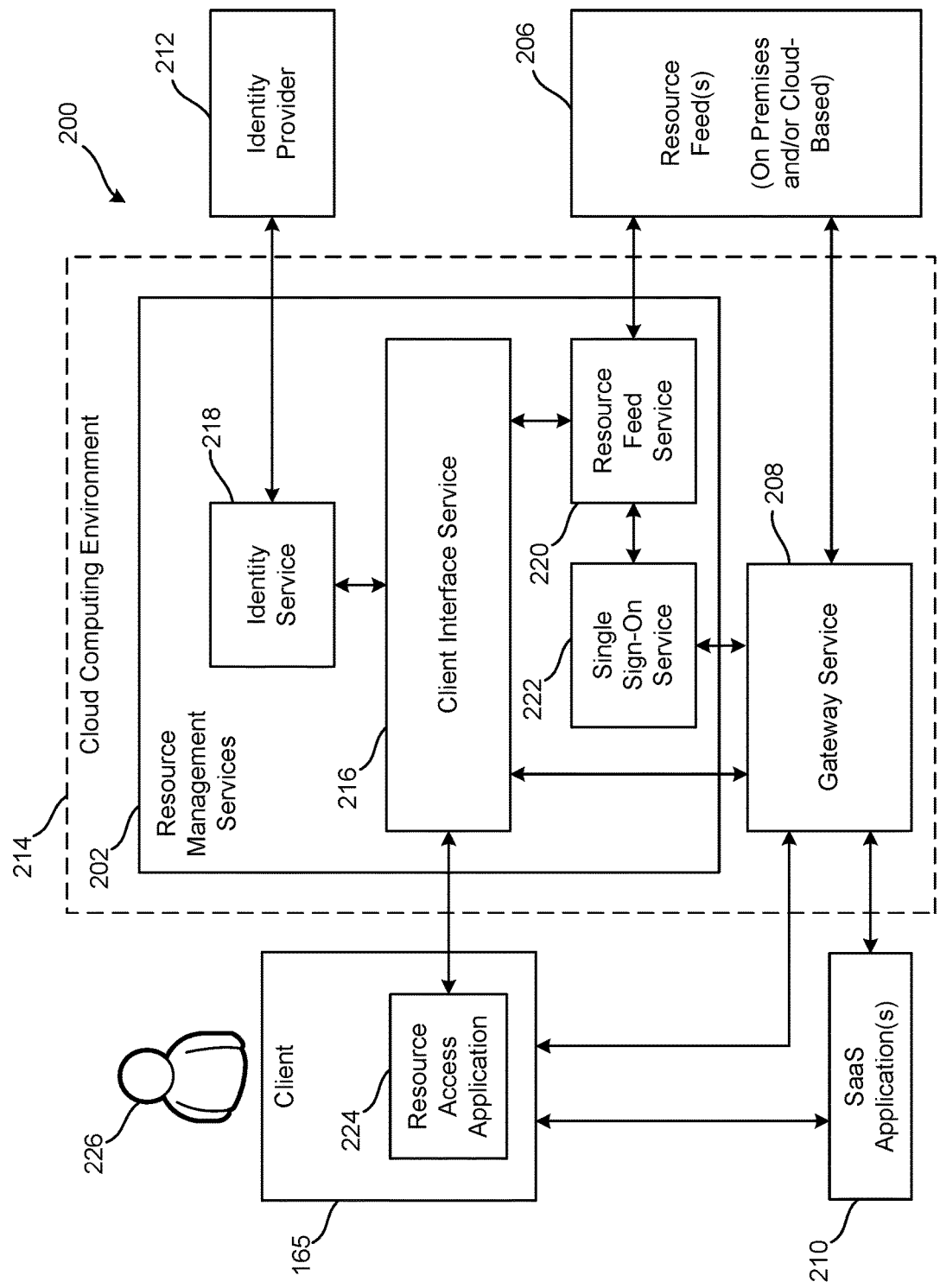
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of the illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well as a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (4) restricting navigation, e.g., by disabling the next and/or back browser buttons, (5) restricting downloads, e.g., by disabling the ability to download from within the SaaS application, and (6) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface—without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
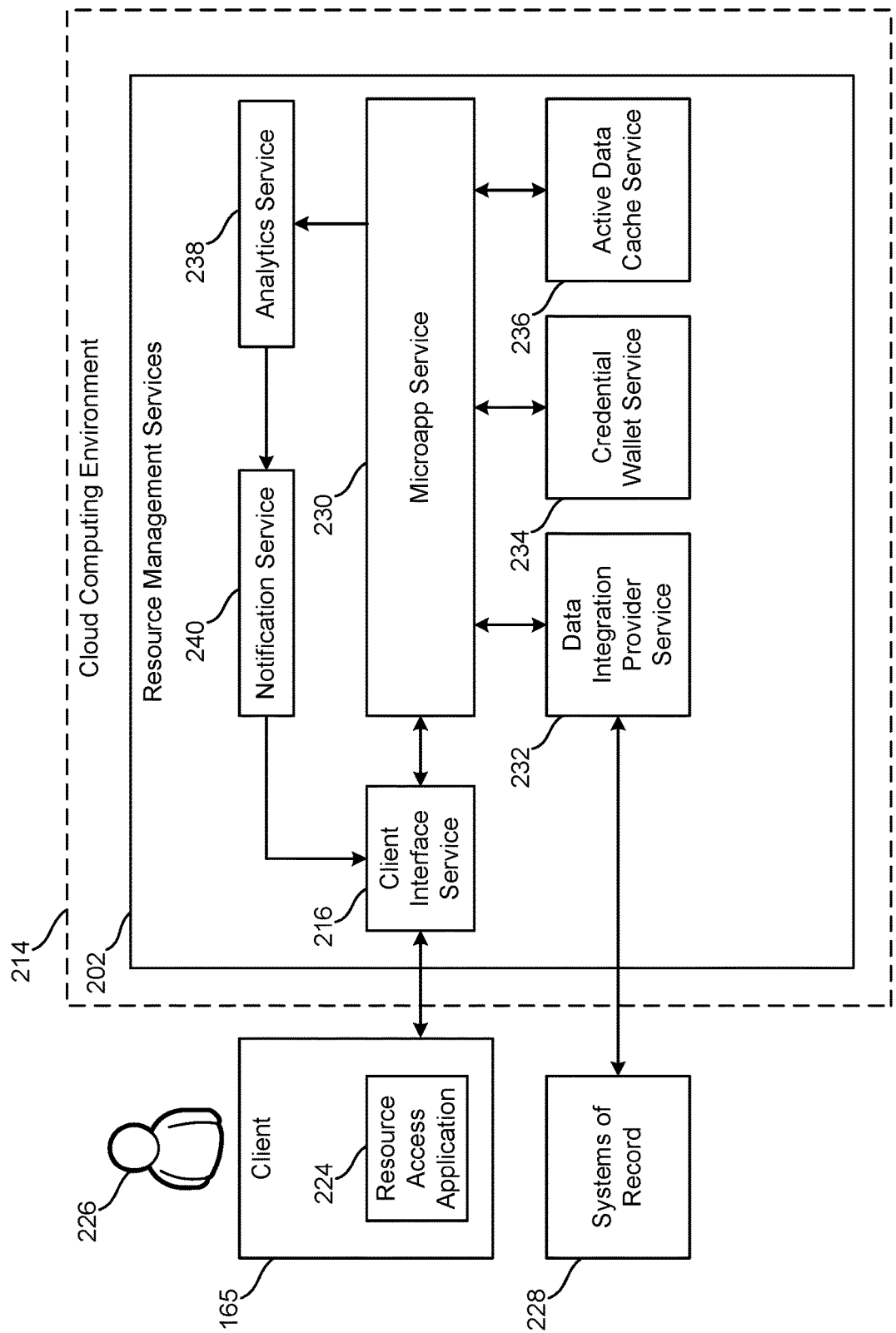
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back end. In some embodiments, users may be able to interact with the virtual assistance through either the resource access application 224 or directly from another resource, such as Microsoft Teams. This feature may allow employees to work efficiently, stay organized, and delivered only the specific information they are looking for.

C. Systems and Methods for Determining Bounce-Able Machines

Client devices can establish sessions with virtual machines executing on servers or other computing devices. The user of the client device may perform login actions to access an application or desktop provided by the virtual machine. The virtual machine can distribute resources to multiple sessions established with the client devices. However, due to the large number of machines that are executing on the servers to provide application or desktop sessions to client devices, it can be challenging to determine which machines are performing poorly, let alone identify performance degradation of each of the machines, the state of each machine, or issues associated with a session of each user. For example, manually identifying one or more machines for which to perform remedial actions can be inefficient, resource-intensive, and time-consuming, thereby causing a delay in resolving performance issues and extended performance degradation of a session.

The systems and methods of this technical solution can identify machines that are performing well or performing poorly, and further identify which of those machines are capable of performing a sequence of actions that can improve the performance of the machine. By identifying machines that are performing poorly, as well as which of those machines can improve their performance by performing a sequence of actions, the systems and methods of technical solution can improve machine performance and user experience in an efficient manner and without unnecessary or excessive delay, latency, or actions by targeting certain machines to perform the sequence of actions.

In some cases, this technical solution can identify or provide a list of machines (e.g., bounce-able machines or session(s) of the machine) configured to perform the sequence of actions. The systems and methods discussed herein can utilize, integrate, or include features of analytics service for performance (e.g., performance analytics) to perform a sequence of actions to restore one or more machines to an operational state. For instance, the systems and methods can identify data associated with a history of actions (e.g., historical data) of individual machines. Based on the historical data, the systems and methods can determine the performance, condition, or state of individual machines, such as machines with poor performance or fair performance. The systems and methods can use the historical data to determine one or more actions for individual machines to restore to a useable state. The actions can be a bounce action or a sequence of actions.

The systems and methods can determine the user experience (UX) associated with the performance of the machine based on the load each user contributes and the number of machines configured to be bounced back to share the load of the users. For example, the systems and methods can identify overloaded machine count, failure score of the machine, the number of machines to be bounced back, or resource consumption of individual users, among others, to determine the performance impact (or UX impact) when the action is taken to the machine. By analyzing the data, the systems and methods can provide a list including machines, performance impact, and recommended one or more actions for individual machines.

The systems and methods can receive or obtain feedback data subsequent to performing actions on one or more machines. The feedback data can include at least one or more actions initiated on the machine, performance increase (or decrease) for the machine in response to the action taken, and feedback from the administrator (e.g., update to the condition or ruleset for recommending machines). Based on the feedback data and the historical data, the systems and methods can update the ruleset for determining machines for bounce-back, thereby updating the list of recommended machines.

Hence, the systems and methods can provide a list of machines and one or more actions to take on the machines to improve the performance of the machines. Each action can be associated with an improvement to the performance of individual machines. Thus, systems and methods of this technical solution can improve the performance of individual machines, restore operations of the machine, reduce resource consumption, traffic, or bandwidth between client devices and servers (e.g., ticket or communication), reduce launch failures, and improve UX connecting to or using the machines.

Furthermore, individual users can be assigned a dedicated machine hosting a session in dedicated virtual desktop infrastructure (VDI) or a single session machine. The user can access network applications or other resources using the VDI session. In some cases, the dedicated assigned VDI session may fail to launch the session upon request from the user. In such cases, the user may attempt to resolve the issue by contacting IT to troubleshoot the issues, such as restarting the assigned machine or log off stale session. As such, the network can experience high traffic from client devices to the remote devices of the administrators or IT help desk. It can be challenging to identify or predict sessions that requires actions due to machines set to maintenance mode, sessions turning stale, lack of resources, or other factors leading to session launch failures.

The systems and methods of this technical solution can utilize the analytics service to collect data from various sources, such as the virtual applications and desktops accessed by the client devices. The data can include launch history, failure reasons, among other types of session launch failures. For example, the analytics service can indicate that a session fails to launch due to unavailable capacity of the virtual delivery agent (VDA). The VDA can include, be a part of, or correspond to the machine hosting a session for the user. In this example, all available VDAs may be used resulting in a lack of capacity to host additional sessions. The VDA can be used to host a single-session operating system (OS). In another example, the analytics service can indicate that the VDA or the delivery group to which the VDA belongs is set to maintenance mode, is in an invalid state, or unavailable state. The invalid or unavailable state of the VDA can be due to an unknown or unavailable power state of the VDA, the VDA was not rebooted after identifying the unusable state or stale state, session sharing is disabled when required to be enabled, or the VDA assigned to the user was removed from the delivery group, application, or site launch by the client device to access the VDI session.

With data from the analytics service, the system can avoid and avert session launch failures using statistical techniques. For instance, the system can use events from virtual application and desktop (VAD) environment or VDI sessions to obtain data for session failures. The system can identify the current power state, maintenance mode state of the VDA or delivery group, and whether any session is executing. If the maintenance mode is on, the system can notify the administrator about the launch attempts and provide suggested actions, such as turn off maintenance mode or notify employees regarding the ongoing maintenance window. If the VDA is in a power off state, the system can notify the administrator to take a power action to restore the machine back to an operational or usable state, such as turning on the power. If there is an existing session, the system can notify the user via message on the session and administrator to perform logoff action. By performing the logoff action, the system can launch a new session in response to an access request. In some cases, the system can notify and suggest for the administrator to perform a reboot on the machine.

Accordingly, the system can identify indications or causes for launch failures and take appropriate action or provide recommended actions to the administrator. The system may perform the appropriate actions to address the launch failures before or upon receiving the request from the user to access the session. Thus, by addressing launch failures when attempting to access VDI sessions, the systems and methods of this technical solution can reduce traffic from repeated attempts to launch the dedicated session, mitigate session launch failures, improve performance of individual machines, reduce downtime, increase UX, and reduce resource consumption in the stale session.

Figure 3:
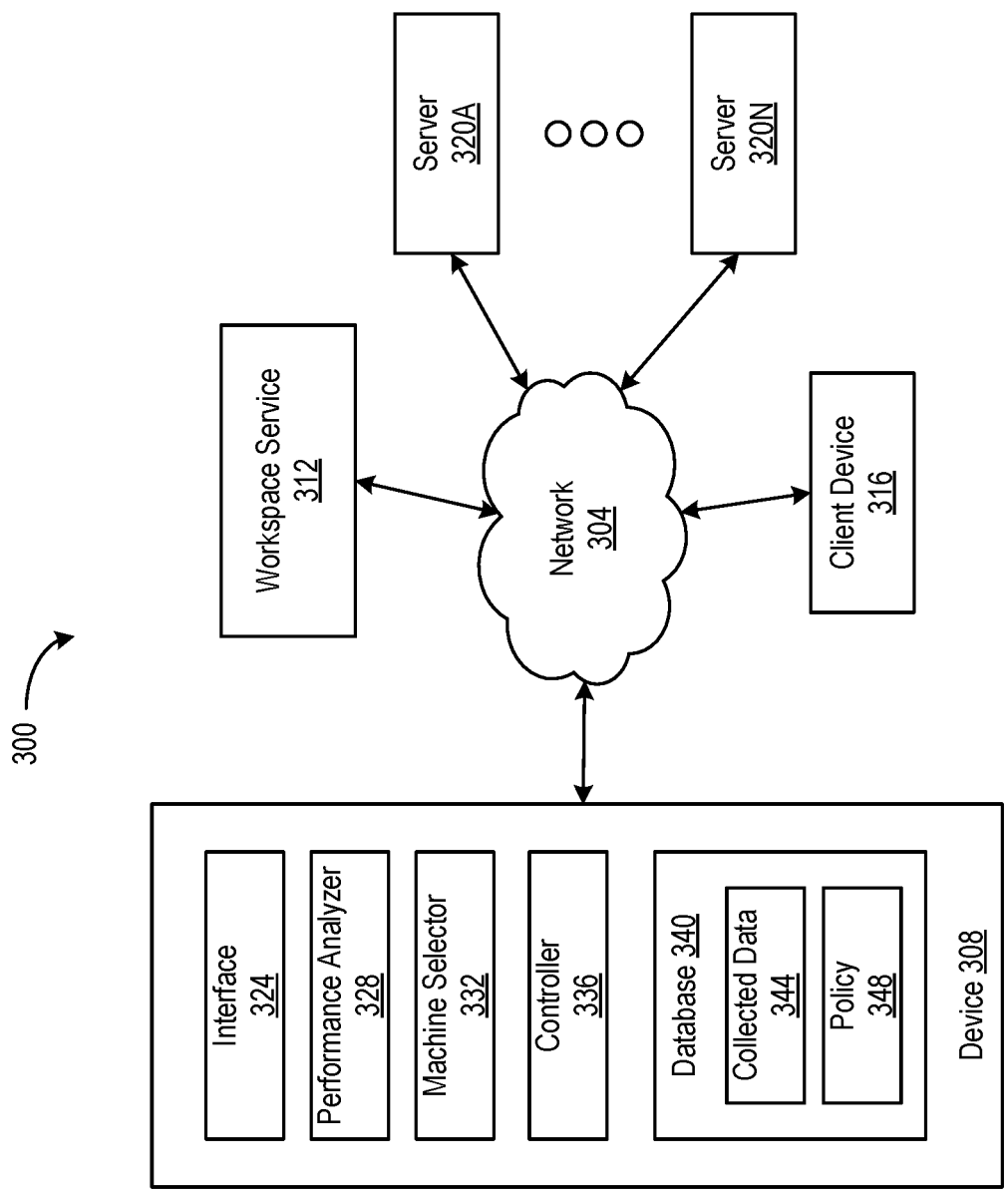
FIG. 3 is a block diagram of an example system for determining bounce-able machines, in accordance with one or more implementations.

Referring to FIG. 3, depicted is a block diagram of one embodiment of a system 300 for determining bounce-able machines. The system 300 can include at least one network 304, at least one device 308, at least one workspace service 312, at least one client device 316, and one or more servers 320A-N (sometimes generally referred to as server(s) 320). The components (e.g., network 304, device 308, workspace service 312, client device 316, or server 320) of the system 300 can include or be composed of hardware, software, or a combination of hardware and software components. The one or more components (e.g., device 308, workspace service 312, client device 316, or servers 320) of the system 300 can establish communication channels or transfer data via the network 304. For example, the client device 316 can communicate with the device 308 through the network 304 and the device 308 can communicate with servers 320 via the network 304. The device 308 can communicate with at least the workspace service 312, the client device 316, or the servers 320 via the same network 304 or different networks 304. The client device 316 can communicate directly with the server 320 or the workspace service 312 via the network 304. In some cases, the device 308 can forward traffic from the client device 316 to the server 320 or the workspace service 312.

The network 304 can include computer networks such as the Internet, local, wide, metro or other area networks, intranets, satellite networks, other computer networks such as voice or data mobile phone communication networks, and combinations thereof. The network 304 may be any form of computer network that can relay information between the one or more components of the system 300. The network 304 can relay information between client devices 316 and one or more information sources, such as web servers or external databases, amongst others. In some implementations, the network 304 may include the Internet and/or other types of data networks, such as a local area network (LAN), a wide area network (WAN), a cellular network, a satellite network, or other types of data networks. The network 304 may also include any number of computing devices (e.g., computers, servers, routers, network switches, etc.) that are configured to receive and/or transmit data within the network 304. The network 304 may further include any number of hardwired and/or wireless connections. Any or all of the computing devices described herein (e.g., client device 316, device 308, servers 320, etc.) may communicate wirelessly (e.g., via WiFi, cellular, radio, etc.) with a transceiver that is hardwired (e.g., via a fiber optic cable, a CAT5 cable, etc.) to other computing devices in the network 304. Any or all of the computing devices described herein (e.g., client device 316, device 308, servers 320, etc.) may also communicate wirelessly with the computing devices of the network 304 via a proxy device (e.g., a router, network switch, or gateway). In some implementations, the network 304 can be similar to or can include the network 170 or a computer network accessible to the computer 100 described herein above in conjunction with FIG. 1A or 1B.

The system 300 can include or interface with at least one client device 316 (or various client devices 316). Client device 316 can include at least one processor and a memory, e.g., a processing circuit. The client device 316 can include various hardware or software components, or a combination of both hardware and software components. The client devices 316 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 316 can include at least one interface for establishing a connection to the network 304. The client device 316 can communicate with other components of the system 300 via the network 304, such as the device 308 or the servers 320. For example, the client device 316 can communicate data packets with one or more servers 320 via the network 304. The client device 316 can communicate with the device 308 via the network 304. The client device 316 can transmit data packets to the device 308 configured to select and forward the data packets from the client device 316 to at least one server 320. In some cases, the client device 316 can communicate with other client devices.

The client device 316 can include, store, execute, or maintain various application programming interfaces ("APIs") in the memory (e.g., local to the client device 316). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 316 can use at least one of various protocols for transmitting data to the server 320. The protocol can include at least a transmission control protocol ("TCP"), a user datagram protocol ("UDP"), or an internet control message protocol ("ICMP"). The data can include a message, a content, a request, or otherwise information to be transmitted from the client device 316 to a server 320. The client device 316 can establish a communication channel or a communication session with a server 320 and transmit data to the server 320. The client device 316 can establish a communication session or channel with the server 320 via the workspace service 312. In some cases, the client device 316 can transmit data to the server 320 to be forwarded to the device 308 (e.g., data associated with actions of the client device 316). In some other cases, the client device 316 can transmit data directly to the device 308. In some cases, data from the client device 316 to the server 320 can be intercepted by the device 308.

The client device 316 can be assigned a machine executing on the server 320 to establish a session. The machine can host multiple sessions for different client devices 316 or users. In some cases, the machine can be a single session machine, hosting a session for individual client devices 316 or users. The client device 316 can provide or transmit credentials input by the user to launch a session or access the workspace service 312. Upon successful launch of the session, the client device 316 can access resources from the workspace service 312 or resources hosted by the machine or server 320. In some cases, the client device 316 may fail to launch the session (or the machine of the server 320 may fail to provide the client device 316 with access to the session) due to unavailable capacity, the number of sessions executing on the machine, among other reasons. In this case, the client device 316 may send an error report, access attempts log, or data associated with a historical action to the server 320 (e.g., to forward to the device 308) or the device 308. Subsequently, the device 308 can execute or perform one or more actions to restore the machine or session to an operational state for the client device 316 to access. In some other cases, the device 308 can restore the machine to an operational state prior to the client device 316 attempting the session launch, such as to prepare for the session launch.

The system 300 can include or interface with one or more servers 320. One or more of the servers 320 can include, be, or be referred to as a node, remote devices, remote entities, application servers, or backend server endpoints. The server 320 can be composed of hardware or software components, or a combination of both hardware or software components. The server 320 can include resources for executing one or more applications, such as SaaS applications, network applications, or other applications within a list of available resources maintained by the server 320. The server 320 can include one or more features or functionalities of at least resource management services or other components within the cloud computing environment. The server 320 can communicate with the client device 316 via a communication channel established by the network 304, for example.

The server 320 can receive data packets or traffic from at least the client device 316. The server 320 can execute at least one machine for one or more client devices 316. The machine can be assigned to at least one user (e.g., multi-session machine or single session machine). The server 320 can serve or handle traffic from client devices 316. The server 320 can be associated with a server hash in a list of servers 320. In some cases, the server 320 can receive traffic from the device 308. In some cases, the server 320 can receive data from the client device 316 via the device 308. For instance, an intermediary device can perform a load balancing technique to distribute traffic from client devices 316 to one or more servers 320, thereby establishing a communication session or channel.

The server 320 can serve the traffic based on the request or instructions from the client device 316, such as to store information, update or configure data on the server, obtain data from the server, among others. The server 320 can transmit data packets to the client device 316 to acknowledge receipt of the data packets or to satisfy a request, for example. The server 320 can communicate with the client device 316 directly after establishing the communication session. In some cases, the server 320 can transmit data packets to the client device 316 through an intermediary device.

The server 320 can include or correspond to a machine hosting sessions for access by the client device 316. For example, the server 320 can host a dedicated session assigned to a particular user or shared session where resources from a machine can be distributed to multiple sessions accessed by multiple client devices 316 or users. The server 320 can provide client devices 316 with access to resources via sessions on the machine. The server 320 can provide the client device 316 with access to resources of the workspace service 312. For example, the resources can include at least virtual applications or virtual desktops (e.g., virtual application and desktop (VAD)). The server 320 can provide the resources upon a successful session launch or in response to the user accessing a workspace environment (e.g., virtual desktop session or remote session). The server 320 can receive data from the workspace service 312.

The server 320 can transmit, forward, or otherwise provide data (e.g., historical data or feedback data) to the device 308. For example, the server 320 can provide machine data to the device 308, such as status, resource utilization, active session count, overloaded machine count (e.g., number of machines unable to handle new traffic stream), failure score (e.g., failed session launch attempts), actions performed by users, or other information from the respective machine. In another example, the server 320 can provide feedback data to the device 308, such as actions taken by the administrator subsequent to receiving a report (e.g., service ticket) from the user or an indication of poor performing (or fair performing) machines or sessions. The server 320 can provide other information to the device 308 to determine one or more bounce-able machines or to perform features or functionalities as discussed herein.

The server 320 may correspond to a machine or multiple machines (e.g., virtual machines). The server 320 may be installed with a virtual delivery agent (VDA). The VDA of the server 320 can be configured to delivery applications or desktops (e.g., virtual desktops) to the user. For instance, the VDA can enable resources hosted on the server 320 (or the machine) to be available to the client device 316. In cases that the server 320 hosts multiple machines, each machine of the server 320 can include or be installed with individual VDAs.

The workspace service 312 can include, store, or manage resources accessible through an application (e.g., workspace application, such as application 210). The workspace service 312 can be implemented using hardware or a combination of software and hardware. The workspace service 312 can provide access to one or more resources to authorized or verified client devices 316. For example, users can log in to an application to launch a session established between the client device 316 and the machine to access features, functionalities, or services provided by the workspace service 312, such as documents or applications. The resources can be hosted by the machine. Based on the account type or level of access granted to the user account, the client device 316 can gain access or be restricted from various features stored or managed by the workspace service 312. The workspace service 312 can include or be linked to a data repository to store resources for the workspace or information of the user accounts. The resources or information can include, for example, client information, credential information, among others.

The device 308 can include various components to determine the performance of machines hosted by the server 320 and providing a list of machines to perform one or more actions. The device 308 can include at least one interface 324, at least one performance analyzer 328, at least one machine selector 332, at least one controller 336, and at least one database 340. The database 340 can include at least one collected data storage 344 and at least one policy storage 348. The policy storage 348 may be referred to as a rule set storage, configuration storage, or setting storage. Individual components (e.g., interface 324, performance analyzer 328, machine selector 332, controller 336, or database 340) of the device 308 can be composed of hardware, software, or a combination of hardware and software components. Individual components of the device 308 can be in electrical communication with each other. For instance, the interface 324 can exchange data or communicate with the performance analyzer 328, machine selector 332, controller 336, or database 340. The one or more components (e.g., the interface 324, performance analyzer 328, machine selector 332, controller 336, or database 340) of the device 308 can be used to perform features or functionalities discussed herein, such as determining and recommending bounce-able machine(s) and actions to restore the machine to an operational state (e.g., useable state). The device 308 can operate remote from the servers 320 or other devices in the system 300. In some cases, the device 308 can be a part of the server 320, such as an integrated device, embedded device, a server operated device, or a device accessible by the administrator of one or more servers 320 hosting one or more machines.

The interface 324 can interface with the network 304, devices within the system 300 (e.g., client devices 316 or servers 320), or components of the device 308. The interface 324 can include features and functionalities similar to the communication interface 115 to interface with the aforementioned components, such as in conjunction with FIG. 1A. For example, the interface 324 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 324 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication. The interface 324 can communicate with one or more aforementioned components to receive data from at least one of the client devices 316 (e.g., traffic size), the servers 320, or the workspace service 312, such as data or information of the machines and feedback data from the server 320.

The performance analyzer 328 can determine the change in performance or an impact on performance associated with a session provided by a machine executing on a server 320 based on data received from the server 320 or a workspace service 312. The performance analyzer 328 can use one or more features, functions, or techniques to determine the performance impact (e.g., change in performance) based on data from at least the server 320 or the workspace service 312. The performance analyzer 328 can determine UX impact based on data from at least the server 320 or the workspace service 312. The performance impact and UX impact may be associated with or correlated with one another. In some cases, the performance analyzer 328 can integrate or perform one or more functions of an analytic service (e.g., performance analytics) to obtain or process data discussed herein. For example, the performance analytics can be features of the server 320 or the workspace service 312.

The performance analyzer 328 can retrieve data from the database 340. For instance, the performance analyzer 328 can identify and obtain data associated with a history of actions performed on one or more machines. The data associated with the history of action may be referred to as historical data or historical action data. The historical data can include at least machine data (sometimes referred to as machine status, machine state, or machine performance) or actions initiated on one or more machines. The historical data can include at least central processing unit (CPU) data, random-access memory (RAM) data, disk usage, resource spikes, process load evaluator index, session count, machine state, or status of each of the machines.

The CPU data can include or correspond to resource utilization including resource spikes. The machine state can include at least one of an invalid state, unavailable state, unknown state, down state, modes (e.g., maintenance mode or sessions sharing mode), or usable state (e.g., active state or operational state). The machine status can include or be associated with one or more processor actions being performed by the machine, such as idle, active, hibernation, or listening for instructions. The machine data can include downtime of the machine or one or more sessions. The session count can refer to the number of sessions (e.g., active or idle sessions) being hosted by individual machines. In some cases, the number of sessions may be one for individual single session machines or at least one multi-session machine. In other cases, the number of sessions may be more than one for individual multi-session machines. In some cases, the data of the machine can be associated with a single session or multiple sessions The performance analyzer 328 can retrieve the data from the database 340 obtained from the workspace service 312 or the server 320. The performance analyzer 328 may retrieve data directly from at least one of the workspace service 312 or the server 320. In some cases, the performance analyzer 328 can retrieve or obtain data from the client device 316 or other remote devices, such as a device of an administrator performing one or more actions on the machine. For instance, the performance analyzer 328 can intercept actions initiated by an administrator device to control the machine executing on the server 320. The performance analyzer 328 can evaluate, correlate, or associate data of the machine (e.g., data associated with the history of actions) to the action performed by the administrator.

The performance analyzer 328 can generate a metric using the data associated with one or more machines. In some cases, the performance analyzer 328 can generate a metric using data associated with one or more sessions of the machine. The metric may include or refer to the performance of the machine or the UX of the user of each session. For example, the performance analyzer 328 can retrieve the data associated with the machine including historical actions performed on the machine. The performance analyzer 328 can determine an aggregated resource utilization of the machine, such as the minimum, maximum, average, mean, or median resource utilization. The performance analyzer 328 can determine the frequency of resource spikes, such as the number of times per hour or other timeframes. The performance analyzer 328 can determine the number of sessions on the machine and resource consumption associated with each of the sessions.

Based on the data, the performance analyzer 328 can determine or calculate the performance of the machine based on the data of the machine. The performance analyzer 328 can assign a score to the machine based on their performance, such as numerical score (e.g., 1 to 10 with 1 being the lowest and 10 being the highest performance) or a character score (e.g., A-F with A being the highest and F being the lowest performance). The character score can be associated with the numerical score in any range (e.g., A is score 1-2, B is score 3-4, C is score 5-6, etc.). In some cases, the score can be separated into three categories, such as good, fair, and poor performance or UX. For example, the performance analyzer 328 can retrieve a configuration or rule set including algorithms or priority of data to score the performance of the machine. The configuration can prioritize resource consumption data, spike frequency, session count, bandwidth utilization of individual sessions, duration of high resource utilization, or one or more combinations of the historical data.

For example, based on the configuration file, the performance analyzer 328 can determine that two spikes per hour may be normal, four pikes per hour may be fair, and 10 spikes per hour may be poor performance. In another example, the performance analyzer 328 can determine that average resource consumption of less than 40% is good performance, between 40% and 80% is fair performance, and above 80% is poor performance. In further example, the performance analyzer 328 can determine that 10 sessions or less per machine is good, 11 sessions to 20 sessions may be fair, and above 20 sessions per machine is poor. In some cases, the performance analyzer 328 can determine the score of the machine based on the number of failed launch attempts (e.g., failure score). For example, the performance analyzer 328 can provide a low score (e.g., configured for bounce) for machines experiencing over a predetermined number of failed launch attempts (e.g., over 10 failed attempts, 20 failed attempts, etc.).

The performance analyzer 328 can combine the statistics or data of the machines to determine the score. In some cases, the performance analyzer 328 can compare the performance of individual sessions to each other to determine the score for individual sessions of the machine. Accordingly, the performance analyzer 328 can evaluate or determine the metric of various machines based on at least the machine data. The performance of the machine can be associated with the UX of one or more users assigned to the machine (e.g., users launching sessions on the machine). For instance, the data can be associated with individual sessions on the machine, such that the performance analyzer 328 can determine the number of users with poor experience (or fair experience).

The performance analyzer 328 can identify an action or sequence of actions performed on the machine. The performance analyzer 328 can identify the types of actions performed on the machine associated with a metric or performance. For example, the performance analyzer 328 can determine the actions performed on machines with low or poor performance (e.g., poor UX). In some cases, the performance analyzer 328 can determine actions performed on machines with fair performance, below good performance, or having a score below 5/10 or below a C grade, for example.

The performance analyzer 328 can determine the action(s) initiated or performed on machines with at least one of high or excessive average resource utilization, unknown state, invalid state, numerous active sessions, frequent spikes, failed sessions launches, or other data affecting the performance of the machine or UX. The types of action can include at least switching a state of the machine (e.g., turning maintenance mode on or off), terminating one or more sessions established on the machine, rebooting the machine or other power actions, or switching session sharing mode. The action can include a sequence of actions, such as executing multiple actions in sequence on the machine.

For example, the performance analyzer 328 can determine that restarting the machine when the machine is in an unusable state restores the machine to an operational state. The performance analyzer 328 can determine that a high failure rate (e.g., failed launch attempts) is due to unavailable capacity. The performance analyzer 328 can determine that restarting the machine, terminating one or more sessions, or transferring one or more sessions to a different machine can reduce the failure rate. The performance analyzer 328 can determine that switching off the maintenance mode in response to completing the maintenance, or one or more failed attempts to launch a session can enable the user to launch the session. The performance analyzer 328 can determine that terminating one or more sessions of the machine can reduce the resources to a satisfying level or threshold (e.g., below 70% resource utilization, among other configurable thresholds). The performance analyzer 328 can determine that turning on the session sharing mode of the machine can reduce the number of failed launch attempts. The performance analyzer 328 can determine other actions performing on the machine and the effect on the performance of the machine in response to the performed action. The effect on the machine can be an increase in performance, reduction in performance, no changes in the response, among others. The actions performed on the machine or the effect on the machine in response to the action can correspond to or be a part of the feedback data.

The performance analyzer 328 can use the metric or data associated with the history of actions of the machines to determine the change in performance of individual machines if one or more actions were applied or initiated to the respective machines. The change in performance can refer to an impact on the performance of the machine. The impact on the performance of the machine can correspond to the UX. The performance analyzer 328 can determine the change in performance based on changes to at least the resource consumption, session count, failure rate, spike frequency, or other machine data. The change in performance can be based on the historical data of the machine having one or more actions taken on the machine. For instance, the historical data can indicate the changes in the performance based on past actions taken on the machine with at least one condition (e.g., performance issue).

In some cases, the change in performance can be based on a simulation. For example, the performance analyzer 328 can perform a simulation or simulate action on one or more machines. The performance analyzer 328 can perform any simulation features or techniques to simulate, imitate, or predict an effect on the machine's performance. For instance, the performance analyzer 328 can determine that a first session and a second session of a machine consume a respective 10% and 30% of resources (e.g., CPU utilization) of the machine. The performance analyzer 328 can simulate a removal or transfer of the first session or the second session. In response to the simulated removal of at least one session, the performance analyzer 328 can predict or determine a 10% decrease in resource consumption when removing the first session or a 30% decrease in resource consumption when removing the second session. In another example, the performance analyzer 328 can determine that restarting the machine can reduce or eliminate launch failures.

The performance analyzer 328 can determine the change in performance or impact on performance as a value or a change in characters (e.g., from D to A performance). For example, the performance analyzer 328 can determine an increase of 30% in performance if a first action is taken. In some cases, the performance analyzer 328 can determine an increase of 50% in performance if a second action is taken. The performance analyzer 328 can rank each action with respect to the machine based on the performance increase or UX impact.

The performance analyzer 328 can determine other metrics of performance impact, such as a reduction of failure rate from taking one or more actions. For example, the performance analyzer 328 can determine a reduction in failure rate to 0.001% (e.g., for an hour, a day, or other timeframes) if a first action is performed. The performance analyzer 328 can determine a reduction in failure rate to 0.1% if a second action is performed. The reduction in failure rate can correspond to an increase in successful launch rate. For example, performing the first action can increase the success rate to 99.999%, and performing the second action can increase the success rate to 99.9%.

In some cases, the performance analyzer 328 can determine a decrease in performance or less than 10% increase in performance if a third action is taken. One or more actions that yield a performance decrease or maintaining similar performance (e.g., less than 10% increase or other configurable value) may not be provided as a recommendation or in a list of actions.

The performance analyzer 328 can compare the change in performance to a threshold. The performance analyzer 328 can determine whether the change in performance satisfy the threshold. The threshold can be included in a ruleset, policy, or configuration file. The threshold can be configured by the administrator of the device 308. For example, the performance analyzer 328 can determine a 25% increase using a first action, 40% increase using a second action, and 45% increase using a third action. With a threshold of 30%, the performance analyzer 328 can determine that the first action does not satisfy the threshold, and the second action and the third action satisfy the threshold. Different actions on different machines can yield or produce a different change in performance. Hence, the performance analyzer 328 can provide the results, output, or processed data to the machine selector 332 to select one or more machines or one or more actions.

The performance analyzer 328 can determine a second change in performance of the machine. The second change in performance can be subsequent or in response to the initiation of the one or more actions. The second change in performance may be a part of the feedback data from the machine. The second change in performance can indicate the difference between the performance of the machine prior to and after initiating the actions. The action performed by the controller 336 can be a part of the feedback data. The performance analyzer 328 can receive the feedback data from a remote device, the server 320, or the workspace service 312.

The performance analyzer 328 can generate or update the rule set or policy for recommending one or more machines or actions based on the feedback data. The rule set can be associated with a respective machine or multiple machines. For example, the performance analyzer 328 can update the rule set for the machine having an action taken on the machine. The performance analyzer 328 can share the rule set with one or more other machines with similar machine data or machines that have not initiated the actions. The rule set can be based on the feedback data, machine data, or historical data of the machine.

For example, the performance analyzer 328 can compare the performance of the machine before and after the initiating the action. The performance analyzer 328 can update the rule set based on the change in performance. If positive change in performance, the performance analyzer 328 can update the rule set indicating that the action on the machine with respect to the machine data yields a possible result. If negative or performance change is less than the threshold, the performance analyzer 328 can update the rule set indicating that the action on the machine based on the machine data yield negative or unsatisfactory results. The action taken can be a recommended action provided with each machine.

The performance analyzer 328 can update the data associated with the history of actions of the machine. In some cases, the performance analyzer 328 can update the data associated with the history of actions of all machines based on the action taken for one of the machines. For example, the performance analyzer 328 can update the data based on the determined first change in performance to provide, suggest, or otherwise recommend actions. The performance analyzer 328 can update the data based on the second change in performance indicating the change (e.g., actual or recorded change) in performance. The data (e.g., updated data) can be used by the machine selector 332. The performance analyzer 328 store or update the data stored in the database 340.

In some cases, the performance analyzer 328 can identify the number of users having poor UX (e.g., low performing machine or poor performance). The performance analyzer 328 can determine or identify the load or resource consumption contributed by the individual users or sessions. The performance analyzer 328 can identify a number of machines that can be bounced back, revert to an operational state, or able to perform one or more actions. Based on the number of sessions or users, their load contribution, and the number of machines configured for bounce back, the performance analyzer 328 can calculate the improvement in UX or performance of the machine from distributing the load from the sessions to one or more other machines (e.g., transferring sessions). Hence, the machine performance can correspond to the UX, for example.

In some cases, the performance analyzer 328 can identify a state of the machine based on the machine data. For example, the performance analyzer 328 can determine that the machine is in an inoperative state including at least one of an unknown state, an invalid state, or a stale state. The performance analyzer 328 can determine, based on the historical data, that at least one of the actions can restore the machine to an operable state. For instance, the performance analyzer 328 can determine the performance increase or a state change based on the historical data associated with actions taken to various other machines (or the same machine) to restore the machine state. Accordingly, the data can be used by the machine selector 332 to provide an identifier of the machine and actions recommended for the machine to restore the machine state.

In some cases, the performance analyzer 328 can compare a first change in performance (e.g., if a first action is initiated) to a second change in performance (e.g., if a second action is initiated) on the machine. For example, the performance analyzer 328 can provide the result of the comparison to the machine selector 332 to select one of the actions to recommend to the remote device or the administrator. The performance analyzer 328 can provide all available actions, such as actions greater than the threshold. The performance analyzer 328 can provide a subset of actions, such as the top three out of five actions greater than the threshold. The performance analyzer 328 may provide a single action, such as a first action that yields a greater increase in performance than a second action.

In some cases, individual actions may be associated with different thresholds. For example, the performance analyzer 328 can compare a first action to a first threshold and a second action to a second threshold, etc. The performance analyzer 328 can determine that individual actions satisfy or do not satisfy their respective thresholds. In further example, a reboot action may be associated with a higher threshold than a terminate session action, or a switch maintenance mode action (e.g., turning off maintenance mode) may be configured with a lower threshold than a power action.

In some cases, the performance analyzer 328 can predict a performance drop and notify the machine selector 332 to recommend the machine or the controller 336 to initiate an action. For example, the performance analyzer 328 can determine, using the data associated with the machines, a timeframe that the performance of one or more machines is below a threshold. The performance analyzer 328 can identify the type of historical actions (e.g., resource consumption, session count, etc.) affecting the performance of the machine. Accordingly, the performance analyzer 328 can determine the change in performance for the one or more machines prior to the drop in performance of the machine. Hence, the performance analyzer 328 can analyze and determine the performance or change in performance of the machines for the machine selector 332 to select at least one machine or the controller 336 to initiate one or more actions (e.g., bounce action) on the selected machines.

The machine selector 332 can receive data provided or output from the performance analyzer 328. The machine selector 332 can generate a list of one or more machines (e.g., a subset of various machines) based on the change in performance of the one or more machines. The machine selector 332 can generate the list based at least on the data associated with history of actions of individual machines. The machine selector 332 can select include one or more machines having a change of performance satisfying a threshold to include in the list. The list may be a table, such as a hash table. The machine selector 332 can store, configure, or update the list in the database 340. The machine selector 332 can generate or update the list, for instance, in response to determining the change in performance or a second change in performance after initiating the action. In some cases, the machine selector 332 can update the list periodically (e.g., preconfigured time), such as every hour, two hours, etc.

The machine selector 332 can generate a list including at least one of an indication of the tenant or machine (e.g., active or inactive machine identifiers), the timestamp (e.g., last updated time), recommendation identifier (e.g., machines recommended for a bounce or to perform actions on), recommendation suggested (e.g., ranking of machines configured or suggested for bounce), or the underlying metric (e.g., the metric used to suggest the respective machines, such as 1) failure rate, 2) unusable state, 3) a high number of unregistration, 4) low or poor UX per feedback from the user, or other factors used to generate the alert or recommendation). The number of unregistrations can include or correspond to the number of users terminating the sessions, such as within a timeframe. The machine selector 332 can provide a user interface including the list to the administrator of the device 308. The machine selector 332 can include any type of user interface elements, such as interactive elements, pop-up icons, notifications, etc. as part of the list. The machine selector 332 can include other information in the list to facilitate the initiation of one or more actions.

The machine selector 332 can rank the machines in the list based on the current or predicted performance of machines. For example, the machine selector 332 can prioritize the lowest-performing machines for a bounce-action. The machine selector 332 can rank the machines based on the priority of individual machines based on the configuration file. The machine selector 332 can rank the machines based on the number of sessions on the machine. The machine selector 332 can rank the list of machines based on the types of metrics used. The machine selector 332 can rank the machines based on the change in performance, impact to the performance, or impact to the UX.

In some cases, the machine selector 332 can generate or update the list of machines based on at least the feedback data, rule set, or policy. For instance, the feedback data can indicate that one or more actions do not improve the performance of the machine. The machine selector 332 can remove or reduce the ranking of the action in the list. In another example, the feedback data can indicate that the action(s) improves the performance of the machine similar to or greater than the change in performance determined by the performance analyzer 328. The machine selector 332 may increase the ranking or score of the action associated with the machine or multiple other machines.

In some cases, the machine selector 332 can identify one or more actions not to initiate for one or more machines based on the policy or rule set. The machine selector 332 may not provide the actions for the machine in the list. In some cases, the machine selector 332 may not receive an indication of the change in performance corresponding to the restricted actions from the performance analyzer 328. For example, based on the policy, the performance analyzer 328 may skip evaluating the change in performance for the restricted action. Hence, the machine selector 332 can include, add, remove, or update actions associated with one or more machines in the list.

The machine selector 332 can provide actions associated with the machine in the list. For example, the machine selector 332 can provide an "initiate" element (e.g., button) for a single interaction to restore the machine state or improve the performance of the machine. The machine selector 332 can provide the actions that will perform upon interaction with the button. In another example, the machine selector 332 can provide various action elements associated with individual actions that result in a performance increase above a threshold with the respective machine. The machine selector 332 can add or remove the action elements based on the rule set. The machine selector 332 can indicate the change in performance for individual actions for bouncing the machine. Bouncing the machine can refer to returning the machine to a usable or operational state. For example, the machine selector 332 can include an action element to perform at least one of switching machine mode (e.g., maintenance mode, session sharing mode, etc.), adding at least one virtual delivery agent (VDA) for the machine to distribute load or increase conference session that can run on the machine, perform a reboot, etc.

The machine selector 332 can receive an indication of a selection of an action or a sequence of actions. The machine selector 332 can provide input (or output) data indicating the selected action to the controller 336. In some cases, the machine selector 332 can select one or more machines from the list of machines. The machine selector 332 can select an action (or multiple actions) to initiate for individually selected machines. The machine selector 332 can provide the selection of the machine and action to the controller 336.

The machine selector 332 can select at least one machine from an updated list of machines. The machine selector 332 can receive an indication of selection from the administrator. In some cases, the machine selector 332 can dynamically or automatically select one or more machines. For example, the machine selector 332 can identify a single action associated with the machine having poor performance. Accordingly, the machine selector 332 can automatically select the one action and the machine.

In another example, the machine selector 332 can identify various actions associated with a machine. The machine selector 332 can select an action corresponding to the highest change in performance. In some cases, certain actions may be restricted for dynamic selection based on the policy, such as terminating sessions or rebooting machines. In some cases, in response to completed maintenance, the machine selector 332 can select one or more machines with an enabled maintenance mode. Accordingly, the machine selector 332 can select a switch-mode action for the controller 336 to turn off the maintenance mode of the machine. The machine selector 332 can select other machines or actions based at least on the change in performance, the rule set, or the machine data.

In some cases, the machine selector 332 can identify one or more machines having an inoperative state including at least one of an unknown state, an invalid state, or a stale state using the data associated with the history of actions performed on the machines. The machine selector 332 can determine that one or more actions provided by the performance analyzer 328 can restore the state of the machine to an operational or operable state. The machine selector 332 can perform the determination based on the historical data or data associated with a history of actions performed on one or more machines. Accordingly, the machine selector 332 can select at least one of the actions or a sequence of actions to increase the performance of the machine or restore the machine state. The machine selector 332 can provide the list of machines to a remote device, the server 320, or any device utilized by the administrator of the machines.

In some cases, the machine selector 332 may not select actions that decrease the performance of the machine. The machine selector 332 may not select actions that turn the machine into an inoperable state. The machine selector 332 can select machines having poor performance. The machine selector 332 can select machines having a fair performance. In some cases, the machine selector 332 can select machines having a performance lower than a fair performance (e.g., 5/10 performance).

The controller 336 can perform one or more actions selected by the machine selector 332 (e.g., selected by the administrator subsequent to receipt of a list of machines and actions). The controller 336 can use one or more features or functionalities of an analytics service or performance analytics techniques to initiate the action discussed herein. For instance, the controller 336 can query one or more cloud application programming interfaces (APIs) to perform the actions. The API can be executed on the workspace service 312 or the server 320. In some cases, the controller 336 can perform or execute the cloud APIs.

The controller 336 can initiate a sequence of actions (or an action) responsive to the selection of at least the machine and the action. In some cases, the selection of a machine can be associated with a respective action having a change in performance greater than a threshold. The controller 336 can initiate the sequence of actions for any machine selected by the machine selector 332. The actions can include at least one of switching the state of the machine (e.g., to maintenance mode, session-sharing mode, or other modes), terminating one or more sessions established on the machine, or rebooting the machine. In some cases, the controller 336 can perform multiple actions in combination or sequence.

The termination of the one or more sessions may be based on the selection of the machine selector 332. For instance, the machine selector 332 can select the one or more sessions to terminate. In some cases, the termination of the one or more sessions may be based on the highest resource-consuming session. In this case, the controller 336 can identify the resource consumption associated with individual sessions (or receive data from the performance analyzer 328). Accordingly, the controller 336 can terminate the session having the highest resource consumption. In some cases, the controller 336 can terminate at least two session consuming the most resources. The controller 336 can determine other features of individual sessions to determine which one or more sessions to terminate.

In some cases, the controller 336 can initiate one of the actions having a higher change in performance. For instance, the controller 336 can identify a first action having a first change in performance and a second action having a second change in performance. If the first change is higher than the second change, the controller 336 can initiate the first action. Otherwise, the controller 336 can initiate the second action on the machine.

The controller 336 can initiate the action based on the rule set or policy. For instance, based on the rule set, the controller 336 may alert the administrator of invalid action.

In some cases, the machine selector 332 can alert the administrator of invalid selection. In some cases, the controller 336 can determine not to perform the first sequence of actions based on the rule set. In this case, the controller 336 may identify a second sequence of actions to initiate for the machine.

In some cases, the controller 336 can initiate, perform, or execute one or more actions on the machine prior to the machine having a poor performance. For example, the performance analyzer 328 can determine that at least one machine will have poor performance at a determined timeframe. Subsequent to a selected action, the controller 336 can initiate a sequence of action prior to, at, or during the timeframe identified by the performance analyzer 328. Hence, the controller 336 can mitigate or avoid poor performance of the machine.

In some cases, the controller 336 can initiate an action including at least one disabling maintenance mode of the machine, initiating a power action on the machine, enabling or disabling session sharing mode for the machine, terminating a session on the machine, or initiating a reboot on the machine. The controller 336 can perform other actions controllable by the administrator, for example. In some cases, the actions can be stored in the database 340. For example, the controller 336 can access the database to retrieve the list of actions to initiate. In some cases, the controller 336 can provide a feedback to the performance analyzer 328. The feedback from the controller 336 can include the sequence of actions initiated on the machine.

The database 340 can include, store, or maintain any information or data as discussed hereinabove. For instance, the database 340 can include collected data storage 344 and policy storage 348. The database 340 can be local to the device 308. In some cases, the database 340 can be remote from the device 308. The database 340 can be accessed by the one or more components (e.g., interface 324, performance analyzer 328, machine selector 332, or controller 336) of the device 308. In some cases, the database 340 may be accessed by the server 320 or the workspace service 312. The database 340 can store one or more information or data discussed herein. For example, the database 340 can store input, processed, or output data by the performance analyzer 328, machine selector 332, or controller 336.

The collected data storage 344 can store at least data associated with a history of actions of individual machines, historical data of selections by the machine selector 332, historical actions by the client device 316, among other information collected from at least the machine, the server 320, or the workspace service 312. The collected data storage 344 can store the actions selected by the machine selector 332 and initiated by the controller 336. The collected data storage 344 can store the feedback data from the machine. The collected data storage 344 can received data from one or more components of the device 308 for storage.

The policy storage 348 can store the policy, rule set, or configuration. For example, the policy storage 348 can store one or more actions that can be performed by the controller 336. The policy storage 348 can store configuration from the administrator including one or more actions capable of initiating on the machines or one or more actions restricted for one or more machines. The policy storage 348 can store an indication of the type of machine data to use for the performance analyzer 328 to determine the change in performance. The policy storage 348 can indicate the refresh time for updating the list of machines. The policy storage 348 can include a ranking of actions or machines based on the change in performance. The policy storage 348 can include an indication of types of actions restricted for certain machines. In further example, the policy storage 348 can include other rule sets or policies updated by the administrator or based on feedback data subsequent to initiating action on a machine.

Figure 4:
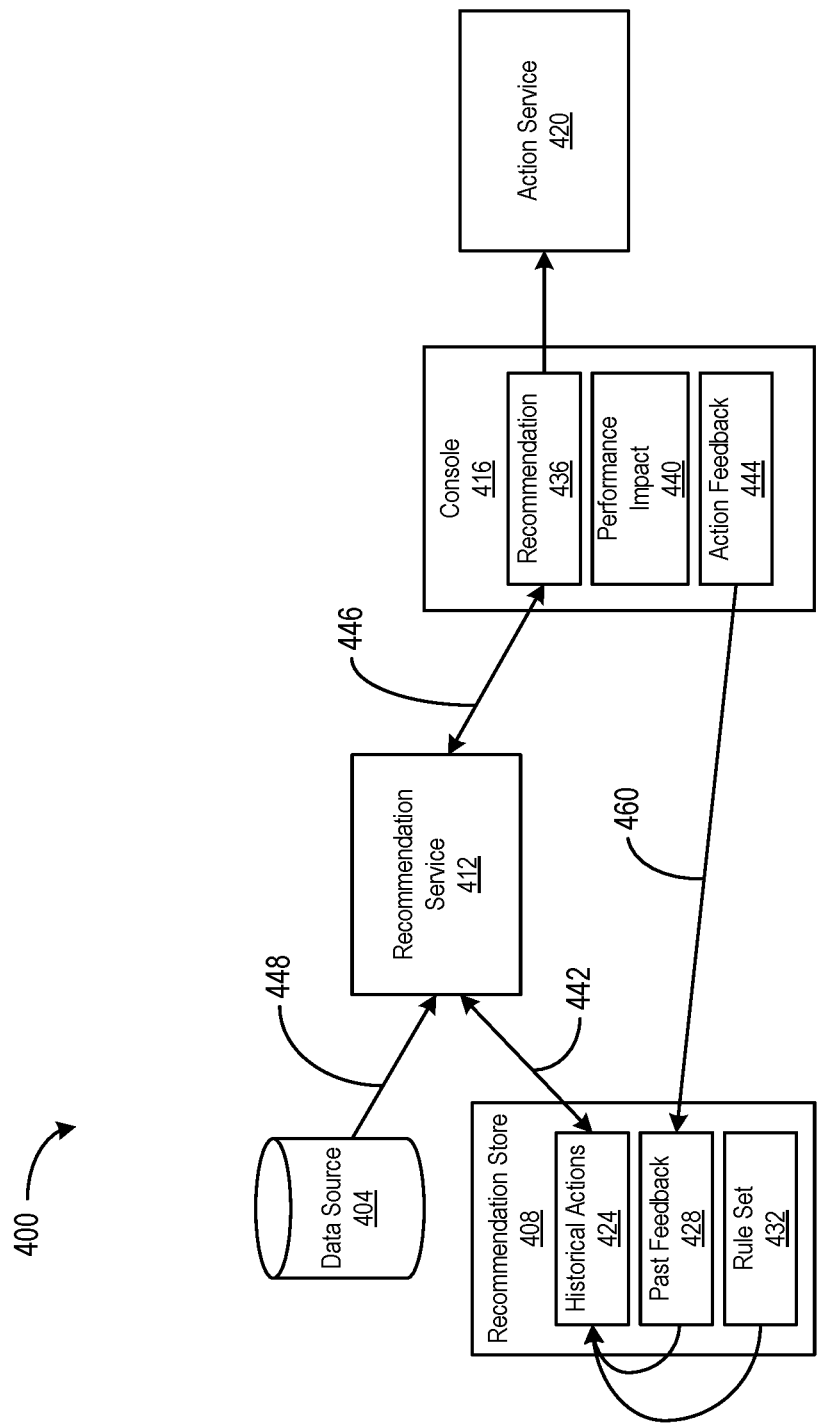
FIG. 4 is an example workflow diagram for recommending machines and actions, in accordance with one or more implementations.

Referring to FIG. 4, depicted is an example workflow diagram 400 for recommending machines and actions to perform on or by the machines. The operations or features of diagram 400 can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. The diagram 400 can include at least a data source 404, a recommendation store 408, a recommendation service 412, a console 416, and an action service 420. The one or more components (e.g., data source 404, recommendation store 408, recommendation service 412, console 416, or action service 420) of diagram 400 can be composed of or implemented with hardware, software, or a combination of hardware and software components. The one or more components of diagram 400 may be a part of the device 308, for example.

The data source 404 can include, store, or maintain historical data associated with the machines. The data source 404 can retrieve data associated with the machines at a predetermined time interval (e.g., every hour, two hours, day, etc.). Historical data can refer to the data collected from or for the machines in the last 24 hours, 48 hours, 1 week, 2 weeks, 30 days, or other previous time interval or period that facilitates identifying machine performance or machines that are capable of and can benefit from executing a sequence of actions. The time interval can be configured by the administrator. In some cases, the data source 404 can update the historical data of individual machines in response to an action or operation by the machine, such as in real-time. The data source 404 can provide historical data of machines to the recommendation service 412, at operation 448. The data source 404 can provide the historical data responsive to a query.

The recommendation store 408 can include at least historical actions 424, past feedback 428, and rule set 432 (e.g., condition, configuration, or policy). The recommendation store 408 can aggregate the past feedback 428 and rule set as part of the historical actions 424. For instance, the historical actions 424 can include the past feedback 428 and rule set 432. The past feedback 428 can include one or more actions from the administrator, among other feedback data, such as actions performed on the machines and the change of performance resulting from the actions on the machines. The past feedback 428 can include actions performed by the device 308. The past feedback 428 can include or store feedback from the administrator or the device 308 on the recommendation or action performed on the machine, as in operation 460. The recommendation store 408 can use data from the past feedback 428 to update the rule set 432. The recommendation store 408 can query or provide historical data for one or more machines to the recommendation service 412, as in operation 442. In some cases, the historical data can include at least the rule set 432 or past feedback 428.

The recommendation service 412 can perform one or more features or functionalities of at least one component (e.g., performance analyzer 328 or machine selector 332) of the device 308. For instance, the recommendation service 412 can receive, retrieve, or obtain machine data, historical action, or other data associated with the machine and action performed by the administrator from the data source 404 or the recommendation store 408. The recommendation service 412 can obtain the data at a time interval configurable by the administrator. In some cases, the recommendation service 412 can obtain the data in real-time, such as in response to an update from the data source 404 or the recommendation store 408. The recommendation service 412 can generate a list of machines (e.g., an engine) for the console 416.

The recommendation service 412 can determine the performance of individual machines. The recommendation service 412 can calculate the performance impact if a sequence of actions is taken on one or more machines (e.g., a suggested machine). Based on the data from at least the data source 404 or the recommendation store 408, the recommendation service 412 can write or provide one or more machines to the console 416 as a recommendation list, as in operation 446. The console 416 can be a separate data source from the recommendation service 412. In some cases, the recommendation service 412 can be a part of or include the console 416.

In some cases, the recommendation service 412 can update the rule set 432 or condition for individual machines. The rule set 432 may be different for each machine. For example, the recommendation service 412 can identify feedback from the administrator or the machine. The recommendation service 412 can determine that the impact of initiating the selected action on the machine may be negative or does not satisfy a threshold (e.g., increase of less than 20%, 30%, etc.). Accordingly, the recommendation service 412 can update the rule set 432 to not recommend or lower the priority of the previously selected action for one or more machines with similar machine data, for example. In another example, the recommendation service 412 can determine positive feedback greater than a threshold (e.g., above 30%, 40%, etc.) based on the past feedback 428. Accordingly, the recommendation service 412 may increase the score or ranking or prioritize the previous action on the subsequent recommendation of one or more machines.

The console 416 can communicate with the recommendation service 412 and the recommendation store 408. The console 416 can include at least a recommendation 436, performance impact 440, and action feedback 444. The console 416 can queue or request a recommendation 436 from the recommendation service 412. The console 416 can receive a recommendation 436 from the recommendation service 412, as in operation 446. The console 416 can receive performance impact 440 associated with one or more actions if performed on the respective machine. For instance, a first performance impact can be associated with a first action of a machine, and a second performance impact can be associated with a second action of the machine.

The console 416 can provide a user interface or the list of machines and actions to the administrator. In some cases, the console 416 can provide the recommendation 436, the performance impact 440, or other recommendations to the action service 420 to initiate an action or a sequence of actions. Subsequent to the action service 420 initiating the action, the console 416 can receive action feedback 444 including data of the machine after initiating the action. The action feedback 444 can include feedback from the administrator on the performance of the machine or UX after initiating the action.

The console 416 can provide the action feedback 444 to the recommendation store 408 as part of the past feedback 428. The action feedback 444 can be used by the recommendation service 412 among other data to update the recommendation 436. Hence, the console 416 can update the recommendation 436 at least based on the action feedback 444. In some cases, the console 416 can send a selection of an action of a machine to the action service 420.

The action service 420 can receive an instruction or data from the console 416. The action service 420 can identify the action selected by the console 416 or the administrator. The action service 420 can identify the selected machine associated with the action. The action service 420 can initiate the action on the machine. Accordingly, the operations of diagram 400 can restore the state or improve the performance of various machines.

Figure 5:
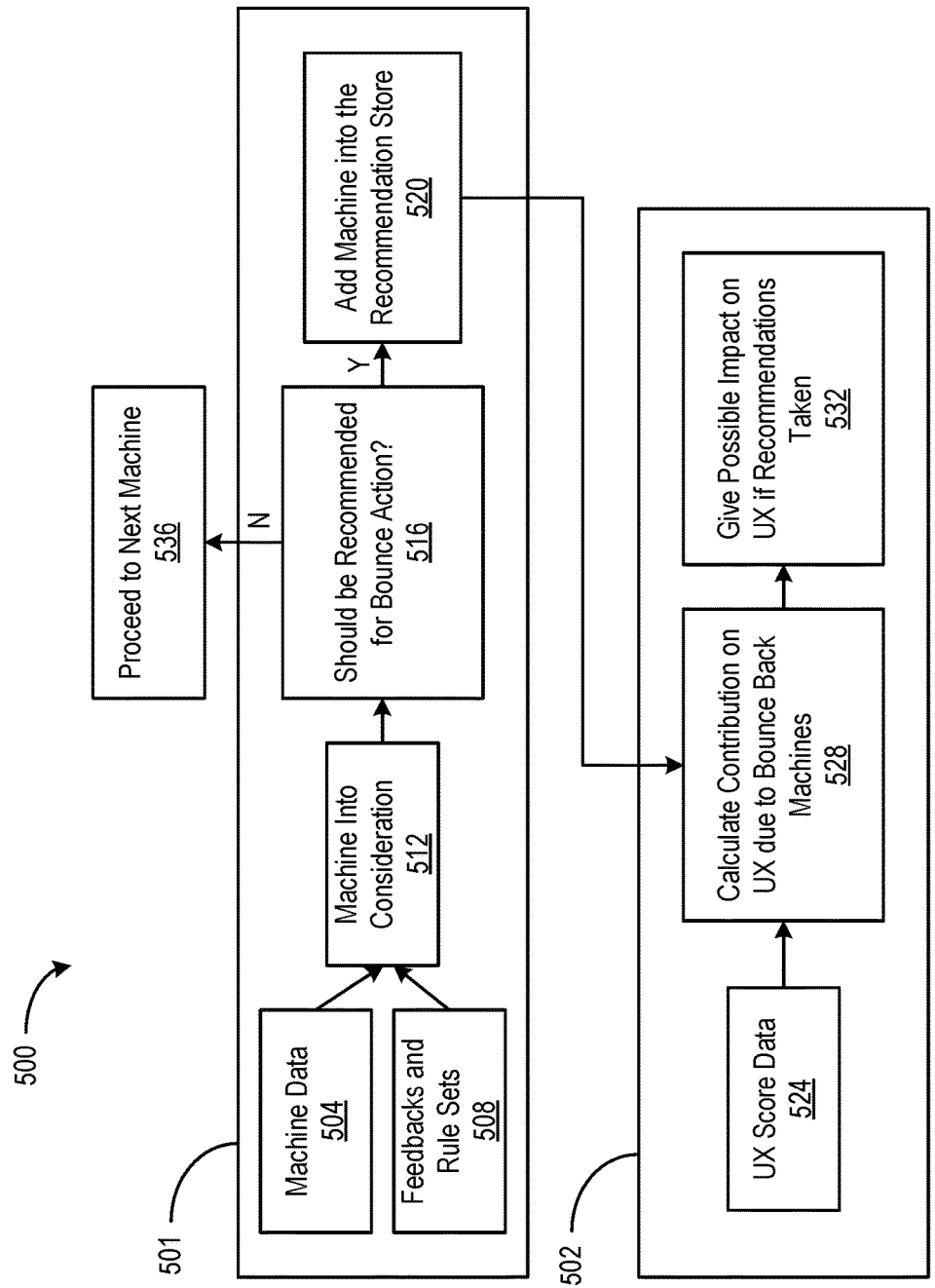
FIG. 5 is an example workflow diagram for determining impact on user experience, in accordance with one or more implementations.

Referring to FIG. 5, depicted is an example workflow diagram 500 for determining impact on user experience. The operations or features of diagram 500 can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. The diagram 500 can include at least an entity recommendation module 501 and a UX impact module 502. The one or more components (e.g., entity recommendation module 501 or UX impact module 502) of diagram 500 can be composed of or implemented with hardware, software, or a combination of hardware and software components. The one or more components of diagram 500 may be a part of the device 308, for example.

The module 501 can receive machine data at operation 405. The module 501 can receive feedbacks and rule sets at operation 508. The module 501 can receive the data associated with a history of actions from a database (e.g., data source 404, recommendation store 408, or database 340). With the machine data and the feedbacks and rule sets, the module 501 can take one or more machines into consideration, in operation 512. In this case, the one or more machines can refer to any active machine, bounce-able machine, inactive machine, or other machines that can perform a bounce action.

The module 501 can determine, for individual machines, whether the machine should be recommended for a bounce action, at operation 516. The module 501 can determine whether the machine should be bounced and one or more actions to initiate based on at least the machine data, the feedbacks, or rule sets.

The module 501 can proceed to the next machine at operation 536 if the machine is at least at a fair performance, greater than a C grade, or above 6/10 score, for example. For instance, the module 501 can determine that the machine should not be recommended for bounce action. Subsequently, the module 501 can proceed to analyze other machines, at operation 536. In some cases, if no other machines are left, the module 501 may exit the operation to determine the UX if a recommendation is taken. The score or performance of the machine can be associated with the UX of users in the sessions of the machine. The module 501 can add the machine into the recommendation store if the machine should be recommended for bounce action at operation 520. The module 501 can provide the recommended machine(s) to module 502.

The module 502 can receive the recommended machine(s) from the module 501. The module 502 can identify UX score data at operation 524. The UX score data can be associated with performance data. For example, machines with good performance can correspond to a good UX. In some cases, the module 502 can identify UX associated with each session of the machine based on at least the machine data, session data, or feedbacks from the administrator.

The module 502 can use the UX score data to calculate the contribution on UX due to bounce-back machines at operation 528. For instance, the module 502 can determine at least the resource consumption, failed or successful launch attempts, among other machine data if one or more actions are initiated on the recommended machine. The module 502 can perform a simulation to determine the UX impact or based on the past actions and results. The module 502 can determine that the UX increased based on the performance increase of the machine. The magnitude of UX increase can be based on the magnitude of the increase in performance. The module 502 may determine a decrease in UX based on a decrease in perform if the action is taken on the recommended machine. Accordingly, the module 502 can provide or give possible impact on UX if recommendations are taken at operation 532.

In some cases, the module 502 can perform the calculation for all machines prior to determining whether one or more machines should be bounced. The module 502 can determine the UX impact for individual actions if performed on the recommended machine. The module 502 can provide the UX impact (or performance impact) with the list of machines recommended for a bounce back.

Figure 6:
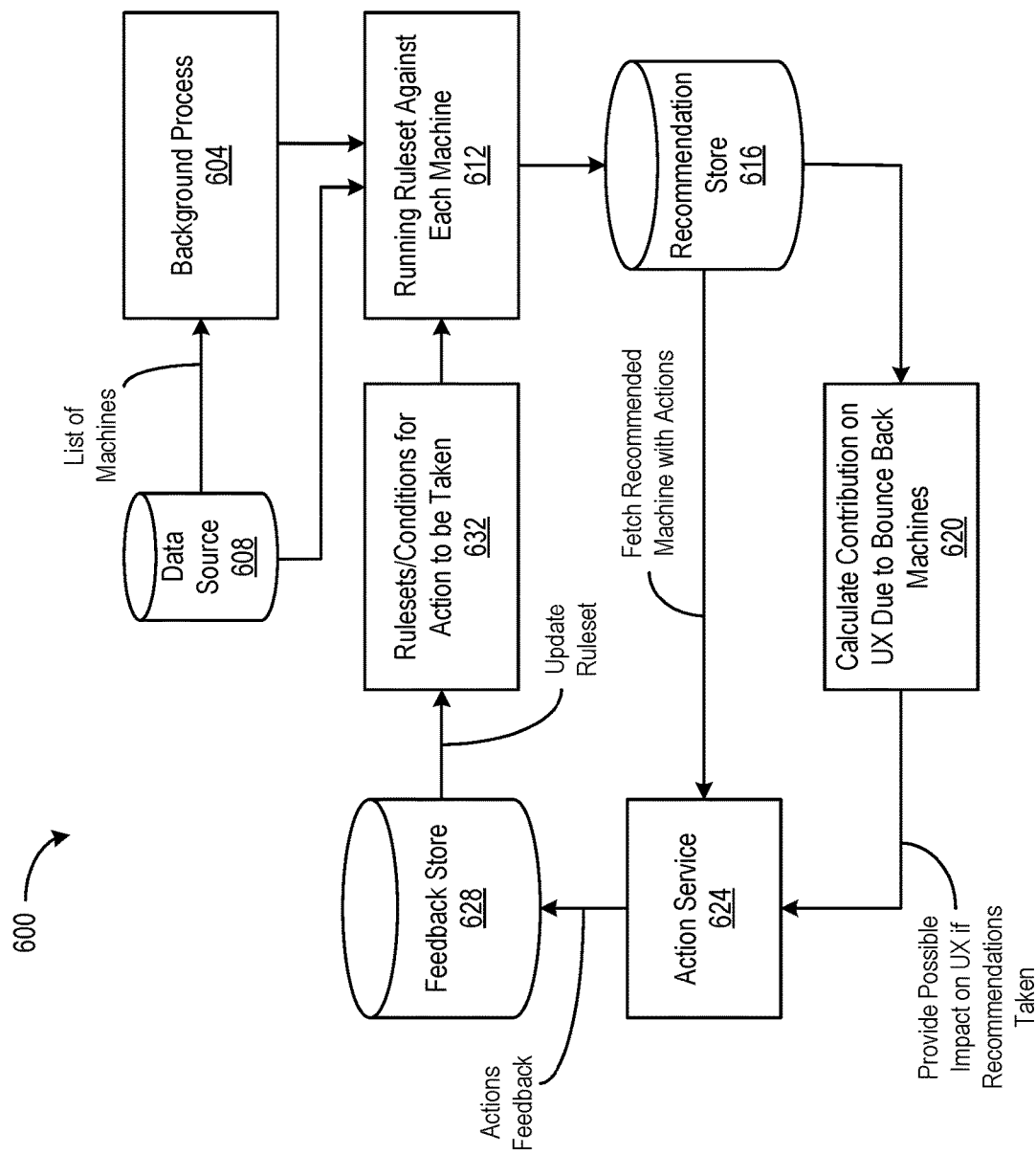
FIG. 6 is an example workflow diagram for recommending bounce-able machines, in accordance with one or more implementations.

Referring to FIG. 6, depicted is an example workflow diagram 600 for recommending bounce-able machines. The operations or features of diagram 600 can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. The diagram 600 can include at least a background process 604, a data source 608 (e.g., similar to data source 404), a recommendation store 616 (e.g., similar to recommendation store 408), an action service 624 (e.g., similar to action service 420), and feedback store 628 (e.g., similar to past feedback 428). The one or more components (e.g., background process 604, data source 608, recommendation store 616, action service 624, feedback store 628, etc.) of diagram 600 can be composed of or implemented with hardware, software, or a combination of hardware and software components. The one or more components of diagram 600 may be a part of the device 308, for example. One or more operations discussed herein can be similar to, a part of, or in addition to operations in conjunction with at least FIGS. 4-5.

The data source 608 can provide a list of machines to the background process 604. In this case, the list of machines can include any machine controllable by the device 308, for example. The background process 604 may be the background process 604 of the device 308. The device 308 can initiate the background process 604 to determine or identify machine data associated with the one or more machines in the list of machines. The device 308 can use the data from the data source 608 and the background process 604. The device 308 can run the rule set against individual machines, as in operation 612. For example, the device 308 can run the rule set against any machine included in the list of machines from the data source 608. In another example, the device 308 can run the rule set against individual machines having poor performance or having an inoperational state. Based on the output from processing the rule set against the machines, the device 308 can determine one or more machines (e.g., in a list of machines) to provide as a recommendation.

The device 308 can provide or add one or more machines to the recommendation store 616. The device 308 can calculate the contribution on UX due to bounce back machines at operation 620. The device 308 can provide an impact (e.g., possible impact) on UX or performance of the machine if one or more recommended actions are taken. Each action can be associated with a different UX or performance impact. The action service 624 can fetch recommended machines with actions associated with each machine from the recommendation store 616. The action service 624 can be a part of the device 308.

The action service 624 or the device 308 can initiate at least one action on the recommended machine. The initiated action can be a part of the feedback data. The device 308 can receive feedback data from the administrator or machine executing the initiated action(s). The action service 624 can provide feedback data to the feedback store 628. The feedback store 628 can store the feedback data discussed herein. The device 308 can use the feedback data to update rule set or conditions associated with the action taken on the respective machine, such as at operation 632. In some cases, updating the rule set for one machine may reflect the rule set of another one or more machines based on the configuration by the administrator, for example. Accordingly, the device 308 can run the updated rule set against individual machines listed by the data source 608 and processed by the background process 604 to update the recommended machine for bounce back.

Figure 7:
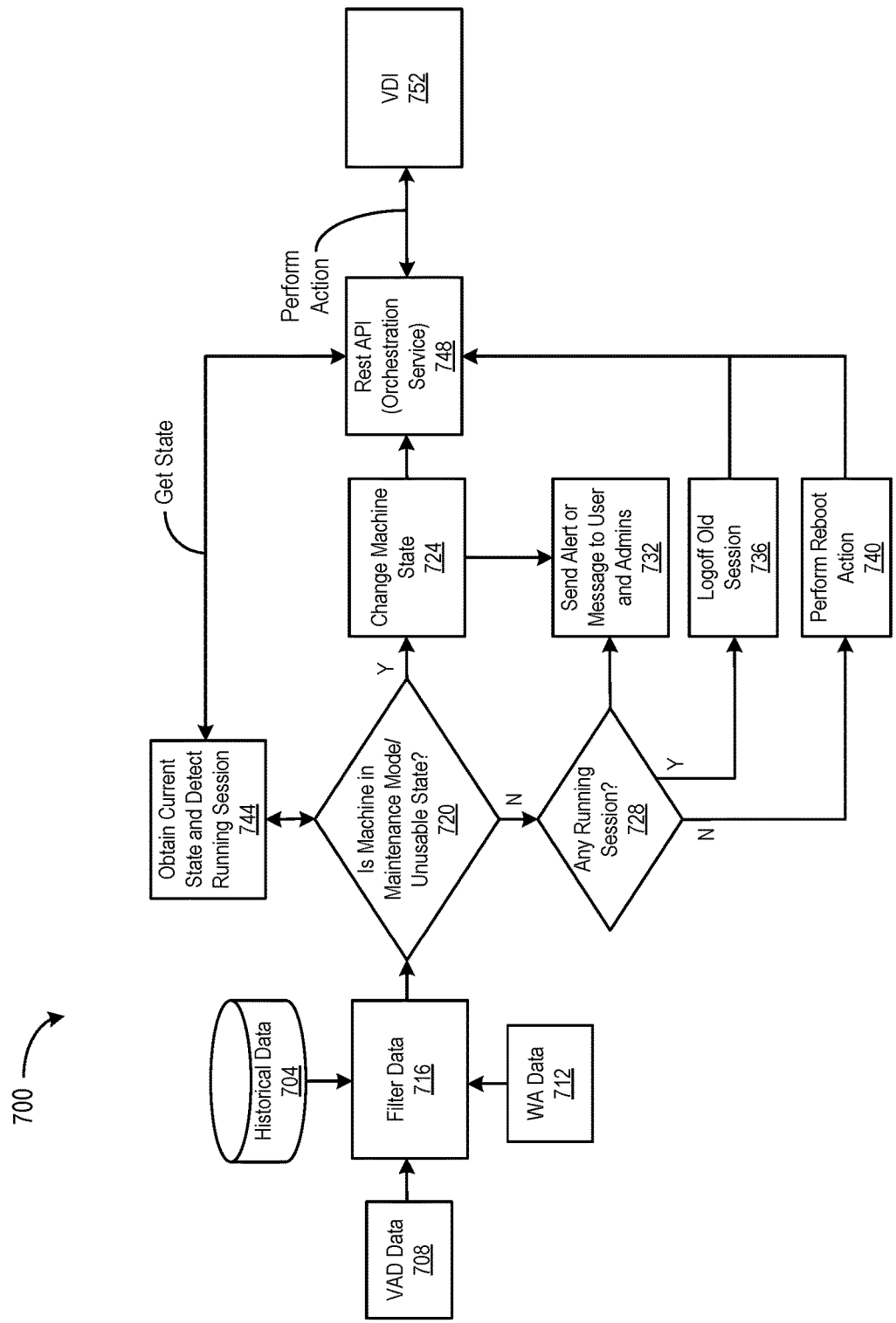
FIG. 7 is an example workflow diagram for detecting unavailable virtual desktop infrastructure (VDI), in accordance with one or more implementations.

Referring to FIG. 7, depicted is an example workflow diagram 700 for detecting unavailable VDI. The operations or features of diagram 700 can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. The features, functionalities, or operations in diagram 700 may be performed in a single session machine. For instance, each machine can be associated with a session.

In operations of diagram 700, the device 308 can identify stale sessions, zombie sessions (e.g., a session that remained on the machine when the client device 316 is not accessing the machine), invalid session, or other session that causes session launch failures. The device 308 can perform one or more actions to restore the session or machine to an operational or usable state. The device 308 can perform the action automatically upon identifying a zombie session, for example. The device 308 can perform the action including at least one of logging off the session, rebooting the machine, or switching maintenance mode to off. By performing the operations automatically, the device 308 can reduce traffic from incoming tickets or reports from the client device 316 failing to launch a session on the machine, increase the performance of the machine, decrease launch failures or increase successful launches, or increase UX. Each machine can be assigned to a respective user.

The device 308 can receive data from various sources, such as historical data 704, virtual application and desktop (VAD) data 708, and workspace analytics (WA) data 712. The historical data 704 can include data associated with a history of actions performed by or on the machine. The VAD data 708 can include data associated with application or desktop resource consumption on the machine. The WA data 712 can include application launch history, failed launch attempts, the application executing on the machine, or other application data. The data can be events associated with the machine. The historical data 704, VAD data 708, and WA data 712 can include other data discussed herein to determine whether a session is stale and historical actions to restore the machine to an operational state.

The device 308 can filter data from the historical data 704, VAD data 708, or WA data 712, at operation 716. The device 308 can filter the data to determine at least the machine performance, status or state of the machine, historical action, or other data at a timeframe. The timeframe can be associated with a date or duration. The device 308 can filter the data to determine the events or reasons for the failure of the session or failure of launching a session. The device 308 can perform one or more filtering techniques to obtain a subset of the data from various different data sources to perform an action on the machine, as discussed herein.

In response to filtering the data, the device 308 can obtain or determine information associated with reasons for connection failure of the machine, such as unavailable capacity on the machine. For instance, the device 308 can identify whether the virtual delivery agents (VDAs) are in used or that the machine has no capacity to host more sessions. The VDA can correspond to a machine assigned to a user for single-session OS VDA. The device 308 can identify that the maintenance mode is on for the VDA or the delivery group that the VDA is a part of. The device 308 can determine that the VDA assigned to the user to launch a session is in an invalid state or is unavailable. For instance, the device 308 can identify, based on the data, that the power state of the VDA is unknown or unavailable. The device 308 can determine that the VDA did not reboot since the past user session. The device 308 can determine that the session sharing is disabled for the VDA, such as in cases where the session requires session-sharing to be enabled. The device 308 can identify that the VDA was removed from the delivery group or site configured to launch the session for the user. Accordingly, based on the data, the device 308 can determine the state or other information related to the machine or VDA.

The device 308 can determine whether the machine is in maintenance mode or unusable state, at operation 720. The unusable state can be based on the current power state of the machine. For example, the device 308 can obtain the current state and detect whether there is a running session on the machine, at operation 744. If the machine is not in maintenance mode or unusable state, the device 308 can proceed to operation 728. If the machine is either in maintenance mode or unusable state, the device 308 can proceed to operation 724.

The device 308 may determine that the machine is in maintenance mode or unusable state. The device 308 can proceed to change the machine state, as in operation 724. For example, the device 308 can determine that the machine is in maintenance mode (e.g., VDI is on maintenance mode). The device 308 can notify the administrator of the ongoing or prolonged maintenance window (e.g., if the maintenance is completed) or to turn off the maintenance mode or request confirmation to switch the maintenance mode off. In some cases, the device 308 can switch the maintenance mode off in response or subsequent to completing the update or maintenance on the machine. Upon changing the machine state to maintenance mode off, the device 308 can notify or alert the user or administrator that the maintenance has been completed or that the maintenance mode is off. In some cases, the device 308 can notify the administrator of the launch attempt for the administrator to determine whether to switch the machine state.

In another example, the device 308 can determine that the machine is in a power-off state or unusable power state. Based on the determination of the power state, the device 308 can notify the administrator of the power state of the machine. The device 308 can initiate a power action to revert or restore the machine to a usable state. For instance, the device 308 can turn on the power of the machine. The device 308 can perform other power action to restore the machine state. Accordingly, the device 308 can notify the user or administrator that the power of the machine is on or in a usable state. The device 308 can switch the state of the machine using an automatic action features or techniques.

The device 308 can determine whether any session is already running on the machine, at operation 728. The device 308 can send an alert or message to the user or the administrator, at operation 732. For example, the device 308 can notify the administrator whether an existing session is running on the machine. The device 308 can notify the user to perform or provide an action, such as providing instruction or interact with the session to determine that the user is active on the session.

In some cases, the device 308 can determine that there is a session currently executing on the machine based on the data. In response to a user request to launch the session or upon determining that the session is stale based on the resource utilization (e.g., constant or no resource utilization on the running session indicating that the user is not active on the session), the device 308 can determine to perform a logoff action to allow a new session to launch. The device 308 can notify provide a notification to the user indicating the initiation of the logoff action. In some cases, the device 308 may prompt the session already running on the machine indicating the logoff action. In this case, if the user is able to access the session, the user may be provided with a predetermined time period to interact with the existing session to prevent logoff action.

In some cases, the device 308 can notify the administrator requesting initiation of the logoff action. The device 308 can proceed to logoff the old session by initiating the logoff action, at operation 736. The device 308 can initiate the logoff action in response to receiving approval from the administrator, determining that the session is stale, or subsequent to a predetermined timeframe after prompting the user in the already running session, for example.

In some cases, the device 308 can determine that the machine is not in maintenance mode or unusable state, and no session is already running on the machine. If the user is unable to launch a session after the aforementioned determination, the device 308 may perform a reboot action, at operation 740. The device 308 may send an alert to the client device attempting to launch the session or the administrator of the reboot. In response to the reboot, the device 308 can initiate a new session upon request from the user.

To perform one or more actions as discussed hereinabove, the device 308 can initiate an orchestration service 748. The device 308 can utilize or call the orchestration service or the representational state transfer (REST) application programming interface (API) (e.g., REST API) or other APIs to initiate the actions on the VDA. For instance, the orchestration service 748 can obtain the state or other data of the machine. The orchestration service 748 may communicate with the VDI to perform an action to restore the state of the machine, as in operation 752. The orchestration service 748 can receive feedback from the VDI indicating an action performed on the machine. In some cases, the VDI can provide a state or condition of the machine after initiating the action to the orchestration service. Accordingly, the device 308 can restore the state of the machine based on the data from various sources, such as analytics service, performance analytics, VAD, WA, or other databases accessible by the device 308.

Figure 8A:
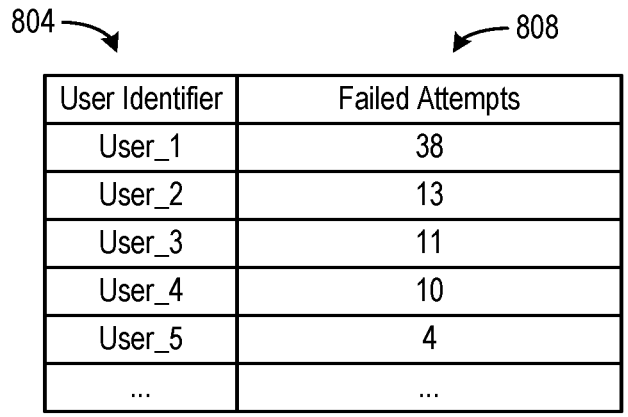

Referring to FIGS. 8A-D, depicted are examples of historical data for detecting unavailable VDI. The operations or features for detecting unavailable VDI, among other features of FIGS. 8A-D can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. Referring to FIG. 8A, depicted is an example table 800A of a total failed launch attempts for users of individual machines. The table 800A can include at least a list of user identifiers 804 and the associated failed attempts 808 (e.g., failed launch attempts) of individual user. For example, the table 800A can include users 1-5 (e.g., user_1, user_2, etc.). The device 308 can determine that the user_1 failed a total of 38 launches. The device 308 can determine that user_2 failed 13 times, user_3 failed 11 times, user_4 failed 10 times, user_5 failed 4 times, etc. Although the table 800A ranked the user based on the number of failed attempts, the table 800A can provide any order, such as alphabetically for user identifier, from lowest to highest failed attempts, highest to lowest failed attempts, among others.

Figure 8B:
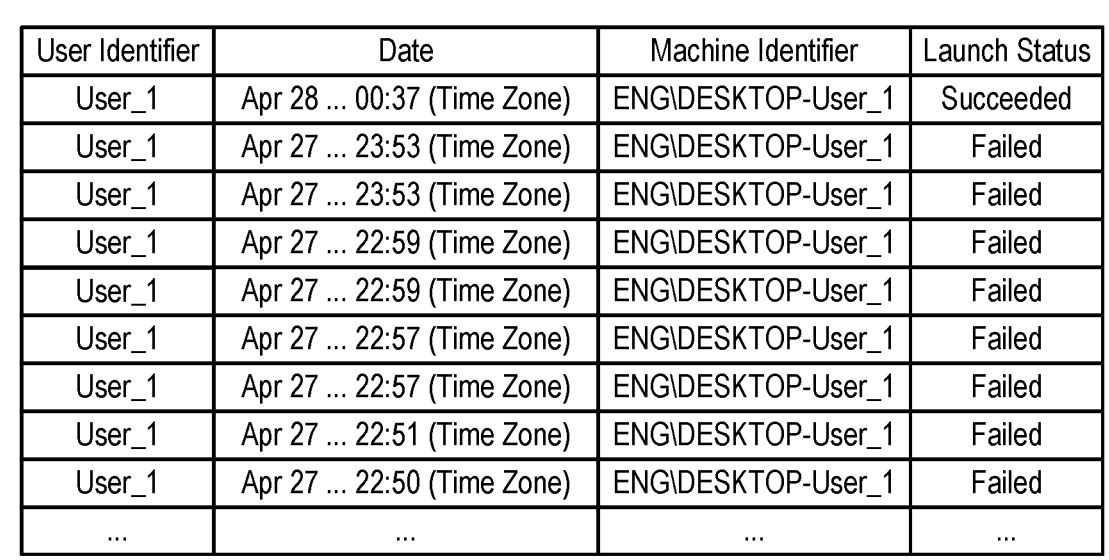

Referring to FIG. 8B, depicted is an example table 800B of launch statuses of user_1. The launch attempts of 800B can include attempts by the user (e.g., user_1) over a 2-day period. The table 800B can include at least the list of user identifier 804 (e.g., user_1 in this case), the list of date 812 associated with individual launch attempts, a list of machine identifiers 816 associated with the machine used by the user, and the list of launch status 820 associated with individual launch attempts (e.g., successful or failed launched attempts). As in table 800A, user_1 failed to launch a session on the machine 38 times. Table 800B illustrates a portion of the failed attempts and a successful attempt at the latest date. The table 800B can be ordered based on the date of the attempt, for example. The data of tables 800A and 800B can be a part of the historical data of the machine (e.g., machine data) or a part of the data associated with a history of actions performed on or by the machine.

The device 308 can perform a root cause analysis for one or more users with failed attempt greater than a threshold. For instance, the threshold may be set as 5. In this example, the device 308 can perform root cause analysis for at least users 1-4. The device 308 can perform root cause analysis for user_1, as an example herein. The device 308 can perform the root cause analysis on data from one or more sources, such as analytics service data, VAD data or other remote data repository including actions or feedback from the machine.

Figure 8C:
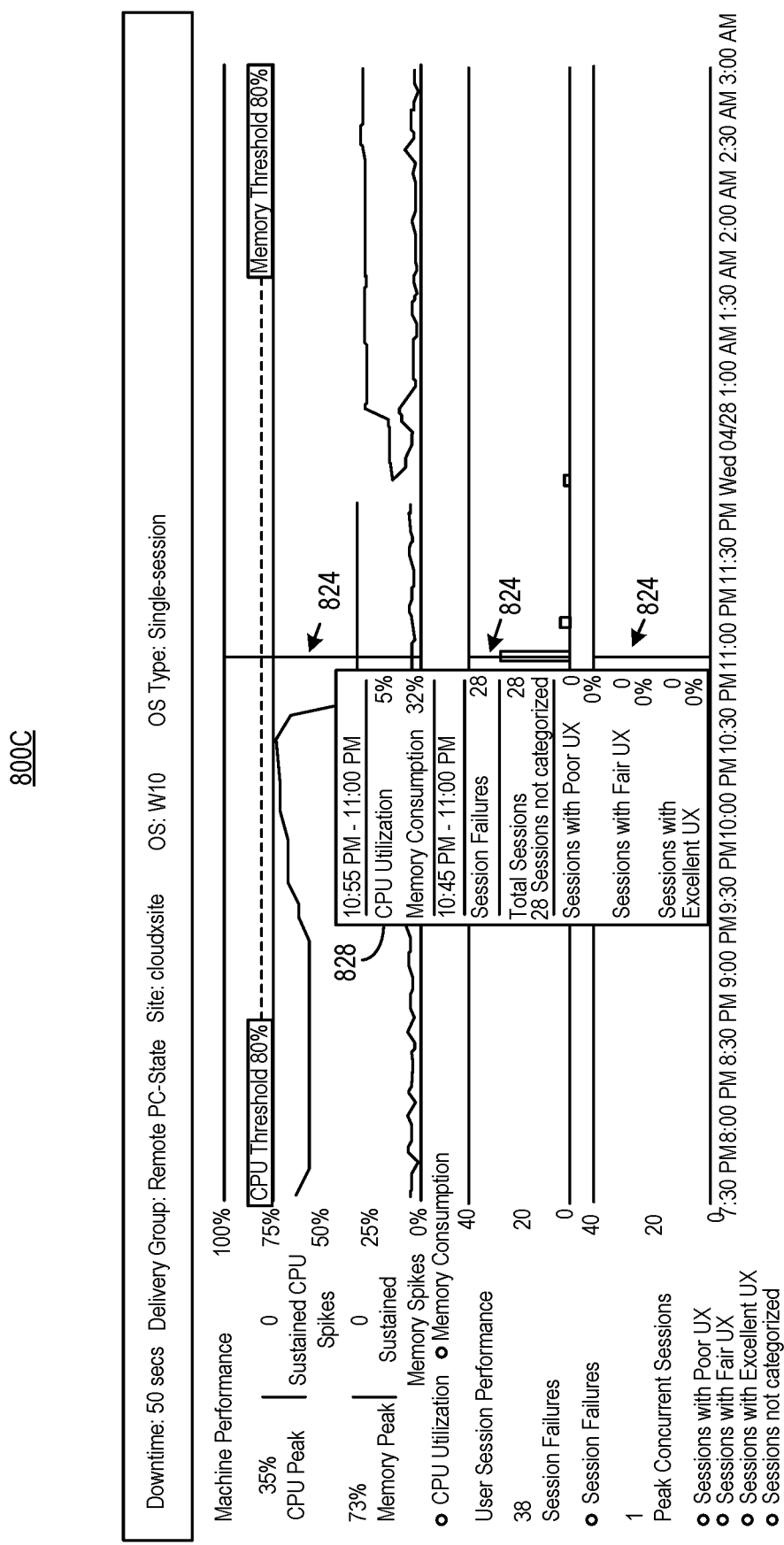

Referring to FIG. 8C, depicted is an example illustration 800C of the data associated with the machine assigned to user_1 indicating an unusable or power off state. For example, the illustration 800C can include at least overall (e.g., average, median, mean, summary, etc.) machine performance 832 and machine data 828 at a timeframe 824. The overall machine performance 832 of at least the portion illustrated in illustration 800C can indicate a CPU peak of 35%, 0 sustained CPU spikes, 73% memory peak, zero sustained memory spikes, 38 total session failures, and one peak concurrent session. Further, the overall machine performance 832 can indicate the total downtime of 50 seconds, the delivery group of the VDA, the site used to launch the session, the OS of the machine, and the OS type running a single-session machine.

The machine data 828 at timeframe 824 can indicate the data of the machine between a first timeframe of 10:55 PM (e.g., a first time) and 11:00 PM (e.g., a second time), in this case. The machine data 828 can indicate a CPU utilization of 5%, memory consumption of 32% at the first time to the second time. The CPU utilization and the memory consumption can be an aggregated value (e.g., mean, mode, average, etc.) between the first time and the second time. The machine data 828 can indicate a second timeframe between 10:45 PM (e.g., a third time) and the second time of 11:00 PM. Between the third time and the second time, the device 308 can identify a total of 28 failed session launches. The device 308 can identify 28 total sessions that are not categorized. In this case, the 28 total sessions may be requested sessions during an unusable state. The 28 uncategorized sessions may not be launched until the machine is operational or in a usable state. In this example, the total number of uncategorized sessions (e.g., attempted session launches) can be the same as the total number of failed session launches, such as during unusable or power off state.

During the timeframe 824, the device 308 can determine that there is no session active or currently running on the machine. The device 308 can determine that the machine is in a power-off or unusable state based on at least the historical data of the machine, the number of failed attempts, the resource utilization (e.g., stable memory consumption without fluctuation), or other machine data. Accordingly, the device 308 can perform an action (e.g., power action to turn on the power of the machine) to restore the state of the machine to a usable state or a power-on state.

Figure 8D:
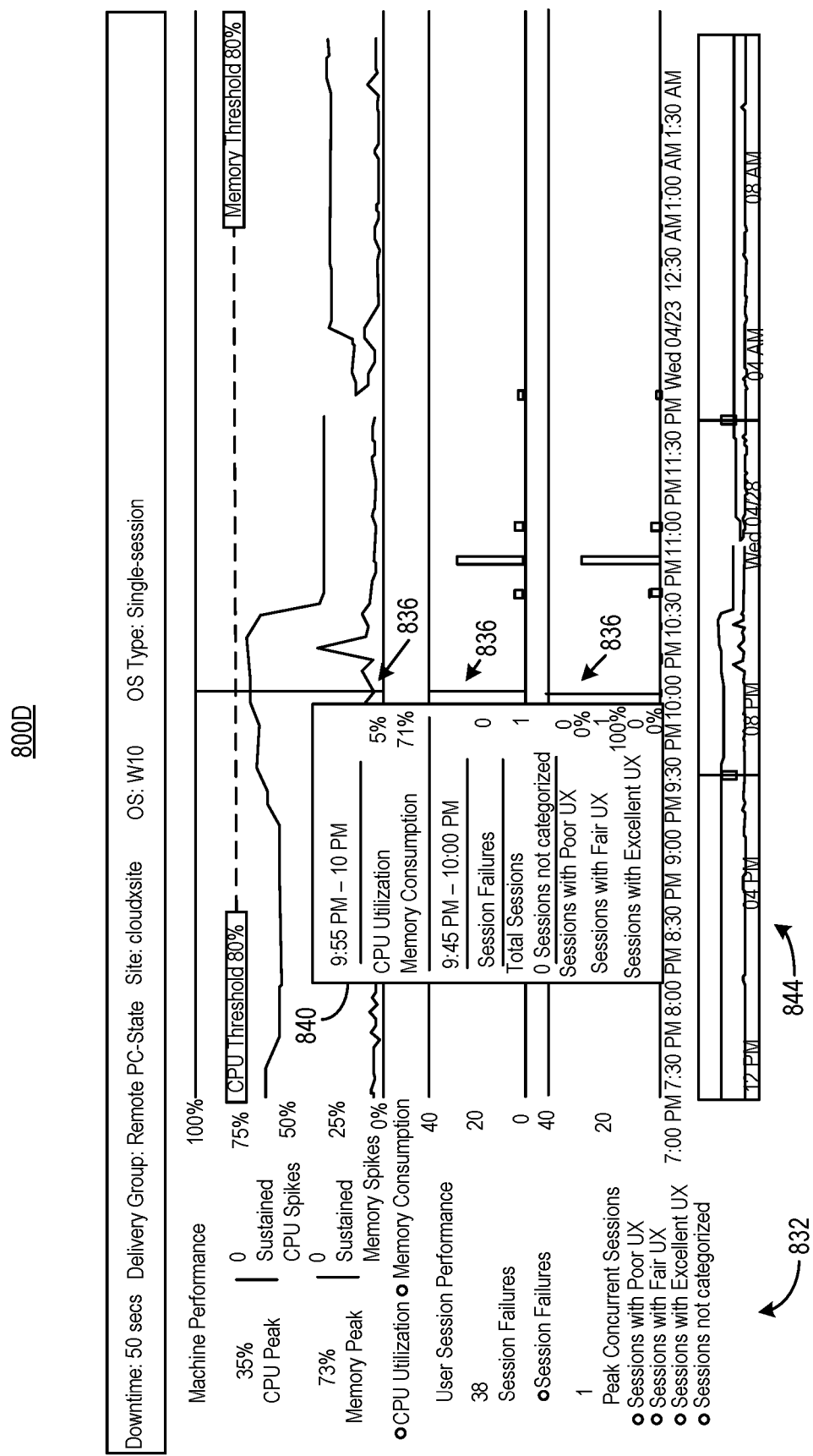

Referring to FIG. 8D, depicted is an example illustration 800D of data associated with the machine assigned to user_1 indicating an already running session on the machine. The illustration 800D can include similar data as in illustration 800C, with machine data 840 at a different timeframe 836. The plot 844 can illustrate that the data included in illustrations 800C and 800D are from a portion (e.g., from 7:00 PM to around 1:30 AM) of the historical data of the machine.

The timeframe 836 of the machine data 840 can be between 9:55 PM to 10 PM or 9:45 PM to 10:00 PM in this example. The device 308 can identify or determine CPU utilization of 5%, memory consumption of 71%, one total session running on the machine, and one session with fair UX. Based on the machine data 828 or other data discussed herein, the device 308 can determine that the session is stale (or a zombie session). In response to receiving a request to launch a new session, the device 308 can perform a logoff action to terminate the old session. Accordingly, the device 308 can provide enable the user to launch a new session, thereby increasing UX for the user using the machine.

FIG. 9, illustrates an example flow diagram of a method 900 for determining bounce-able machines. The example method 900 can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. The method 900 can include a device (e.g., device 308) identifying data of a history of actions, at step 905. At step 910, the device can determine a change in performance. At step 915, the device can determine whether the change in performance is greater than a threshold. At step 920, the device can generate a list of machines. At step 925, the device can select a machine. At step 930, the device can initiate a sequence of actions. For the purposes of providing examples, the logical operations discussed in steps 905-925 can be performed by the device 308 or other components in conjunction with at least FIG. 3.

Still referring to FIG. 9 in further detail, at step 905, the device can identify data associated with a history of actions performed on various machines. In some cases, the data may be a history of actions performed by the machines. The device can identify the data from various different sources, such as from a server, analytics service, VAD database, local storage of the device, the cloud, or other remote data repositories. The data can include at least one of CPU, RAM, disk usage, resource spikes, process, load evaluator index, session count, state, or status of individual machines. The device can receive or obtain the data from the database. In some cases, the device can update the data stored or maintained in the database. For instance, the device can receive an updated data or new data from a machine or a remote device. The device can transmit the data to the database to store, replace existing data, or modify the existing data.

In some cases, the device can generate a metric using the data associated with one or more machines. The metric can be associated with the performance of the machine (or change in performance of the machine). The device can generate the metric based on the type of performance. For example, the device can generate a first metric based on the failure rate of the machine within a predetermined timeframe (e.g., an hour, 3 hours, etc.). The first metric can indicate the performance of the machine based on the launch failure rate. The device may generate a second metric based on the downtime duration of the machine. The device can generate a third metric based on the number of session unregistration. The device can generate a fourth metric based on the spike frequency within a predetermined timeframe. The device can generate other metrics based on other data associated with the history of actions on the machine.

At step 910, the device can determine a change in performance of one or more machines if a sequence of actions (e.g., or at least one action) were applied to individual machines. The device can determine the change in performance using the data associated with the history of actions. In some cases, from various machines listed in the database, the device can determine the change in performance for a subset of the machines. For instance, the device can select one or more machines based on a rule set or policy indicating that the machine can perform the bounce action or a sequence of actions. The device can select one or more machines to determine the change in performance based on feedback data from past actions performed on the machine. The device can select the one or more machines based on the machine data indicating that the current performance is below a threshold, such as based on one of the metrics. Accordingly, the device can determine the change in performance of a subset of machines listed in the database.

The device can determine the change in performance of the machines responsive to the sequence of actions on the one or more of the machines. For instance, the device can determine the change in performance using an updated data based on at least the feedback data from previous one or more actions performed on the machine or other machines. The device can use the updated data based on machine data after initiating the sequence of actions. In some cases, the device can compare the change in performance between different sequences of actions. For instance, the device can determine a first change in performance of one or more machines if a first sequence of actions is executed on the machine. The device can determine a second change in performance of one or more machines if a second sequence of actions is executed on the machine. The device can compare the first change in performance to the second change in performance. The device can rank or provide different scores to the change in performance based on the actions taken. The device can determine the change in performance using the metric or the data associated with the history of actions. The change in performance can be in response to the sequence of actions (or other sequences of actions on the machines).

At step 915, the device can determine whether the change in performance satisfies the threshold (e.g., change in performance threshold). For instance, the device can compare one or more changes in performance associated with a respective sequence of actions on the machine to the threshold. The threshold can be configured by the administrator. The threshold can be a part of the policy or rule set to determine one or more devices or actions to recommend. The device can determine one or more actions associated with one or more changes in performance to satisfy the threshold. Accordingly, the device can determine whether to include the machine in a recommendation list (e.g., any type of recommendation scheme) or one or more actions in the recommendation.

The device can compare different changes in performance between different sequences of actions to be initiated on the machine. The change in performance can be different between different machines based on the machine data, for instance. For example, the device can determine a first change in performance associated with a first sequence of actions and a second change in performance associated with a second sequence of actions. The device can determine that a first change in performance is greater than a second change in performance on the machine. Accordingly, the device can rank the first sequence of actions higher than the second sequence of actions (e.g., prioritize the first sequence of actions). Otherwise, the device can prioritize the second sequence of actions over the first sequence of actions. In this example, the first change in performance and the second change in performance can be greater than or equal to the threshold. The device may not include a change in performance that is less than the threshold.

In some cases, the device can determine, using the data associated with the machines, a timeframe that the performance of one or more machines is below a threshold (e.g., performance threshold). For example, the device can determine that at a predetermined timeframe on one or more days, the machine experiences a drop in performance (e.g., increased in resource spikes, session failures, etc.). The device can determine the machine to generate the list including the one or more machines that will have a performance below a threshold (e.g., poor performance) at the timeframe. The device can provide an indication of the timeframe that the machine may experience a drop in performance for the administrator to take action prior to or during the performance degradation of the machine.

In some cases, the device can determine for a machine that the change in performance does not satisfy a threshold. Accordingly, the device can proceed to step 905 to identify historical data for other machines to determine whether to recommend the machines, for example.

At step 920, the device can generate a list including one or more machines of various machines (e.g., machines indicated in the data source). The device can generate the list based on the change in performance of the one or more machines satisfying the threshold. For instance, the device can include one or more machines whereupon initiating a sequence of actions, would increase the performance of the machine above the threshold. The device can provide one or more sequences of actions that would increase the performance of the machine above the threshold.

In some cases, the device can provide a single sequence of actions associated with the highest change in performance. For example, the device can rank the action and the machine based on at least one of the change in performance between different actions, the current performance of the machine (e.g., below a threshold or having the lowest performance), the types of sequences of actions producing a change in performance greater than the threshold, or based on the condition of individual machines. Accordingly, the device can generate a list of machines and one or more sequences of actions recommended to initiate for the machine.

At step 925, the device can select at least one machine of the machines based on at least the change in performance of the machine satisfying the threshold. The device can select the machine from the list of machines. For instance, the device can determine that subsequent to initiating a sequence of the machine, the change in performance of the machine satisfies the threshold. The device can select the machine based on the change in performance of the machine. In some cases, the device can select at least one sequence of actions to initiate on the machine. The device can select multiple machines (e.g., a first machine and a second machine of the machines) with changes in performance satisfying the threshold.

In some cases, the selection can be performed by the administrator of the device subsequent to receiving the recommendation of the machine or actions. In some other cases, the device can automatically select the machine and at least one action associated with the change in performance greater than the threshold. For example, the device can determine a change in performance of different actions to perform on the machine. The device can compare the different changes in performance associated with individual actions. The device can select an action having the highest change in performance for the machine. In some cases, if only one action is available, the device can automatically select the action to initiate on the machine.

The device can determine to initiate an action for one of the machines. For example, the device can determine the change in performance for a first machine and a second machine. The device can compare the actions to perform on the first machine and the second machine contributing to the change in performance. The device may select the machine having the higher change in performance. In some cases, the device may select the machine that does not require a reboot action. In some other cases, the device can select the machine having more session count or less session count. The device can perform other determination schemes to determine one or more machines to select.

The device can retrieve updated data from the database including a different rule set. Based on the rule set, the device can select a different machine (e.g., a second machine) from an updated list of machines, such as based on feedback data or historical data subsequent to initiating a past action. For instance, the rule set can indicate types of actions to take or not to take depending on the machine data or performance of the machine. Accordingly, the device can select a second machine (e.g., the next machine to take action on) based on the change in performance of the second machine satisfying the threshold and the rule set, for example. The device can perform other operations herein to determine one or more machines to select.

At step 930, the device can initiate the sequence of actions on the machine responsive to the selection (e.g., by the device or the administrator). The device can perform different actions based on the selected machine or selected action.

The device can initiate the action to restore the machine to a usable state, increase the performance of the machine, or increase UX of individual sessions. For instance, the device can switch a state of the machine to maintenance mode. The device can terminate one or more sessions established on the machine. The device can execute a reboot on the machine. The device can perform the actions in sequence, individually, separately, or concurrently.

In some cases, the sequence of actions can include at least i) disabling maintenance mode of the machine, ii) initiating a power action on the machine, iii) enabling a session sharing mode for the machine, iv) terminating a session of the machine, v) or initiating a reboot on the machine. The device can initiate the actions for a single session machine or multi-session machine. The device can have access to communicate with the machine or control the machine. In some cases, the device can make an API call to initiate one or more actions on the machine.

The device may perform the sequence of actions in response to receiving an indication of a selection of a machine or the sequence of actions by an administrator. In some cases, selecting the machine can automatically initiate the sequence of action associated with the highest change in performance. The device can initiate the action automatically, such as in response to determining that a sequence of action results in or yields the highest change in performance. For example, the device can select an action from a list of actions associated with a respective machine based on the score of each action (e.g., the change in performance). Based on the rule set configured by the administrator or based on feedback data from the machine, the device may not select at least one of the actions. The device may select a first sequence of actions or a second sequence of actions based on the greater change in performance of the two, for example. Accordingly, the device can initiate the sequence of action in response to the selection. In some cases, the rule set can indicate one or more machines configured for automatic actions and one or more other machines may not be configured for the automatic actions. Hence, as an example, the device can select machines and perform actions automatically without manual intervention.

The device can initiate the action during the timeframe of the machine experiencing poor performance (e.g., high failure rate, frequent spikes, etc.). In some cases, the device can initiate the sequence of actions on at least one machine prior to or during the timeframe in response to determining that the sequence of action results in a change in performance greater than the threshold. For example, the device can predict or determine a timeframe that the performance of the machine drops below a threshold due to at least one of the performance metrics. The device can determine one or more actions to resolve the drop in performance. The device can select and initiate the sequence of actions before the drop or during the drop in performance below a threshold. Hence, the device can prevent failed session launches or other performance degradations.

Subsequent to the initiation of the sequence of actions, the device can determine a second change in performance of the machine. In this case, the second change in performance can refer to the performance of the machine after the initiation of the action to restore the machine state or improve machine performance. The second change in performance may refer to an actual change in performance from the previous performance to the performance of the machine after the initiation. Hence, the device can calculate the difference between the past and present performance of the machine to determine the performance change.

The device can receive feedback (e.g., feedback data) from the machine or a remote device subsequent to initiating the sequence of actions. The remote device may be a device of the administrator to determine the improvement in machine performance or UX. Based at least on the feedback from the machine or the remote device, the device can generate or update the rule set for one or more machines. For instance, the device can update the rule set for the machine that initiated the sequence of actions. In another example, the device can update the rule set for multiple machines, such as machines with similar machine data or features as the machine. In further example, the device can update the data associated with the machines based on the second change in performance and the feedback data.

Subsequent to updating the data or receiving feedback, the device can update the list of machines to recommend. The device can update the machine in response to a predetermined time interval. By updating the list, the device can remove, add, or maintain one or more machines or actions associated with the machines. The device may perform a different selection of machines or actions based on the updated list. For instance, the device can initiate a second sequence of actions on the machine or a different machine based on at least the rule set, the machine data, the feedback, or other data from various data sources. The device can proceed to step 905 to update data or perform additional recommendations.

FIG. 10 illustrates an example flow diagram of a method 1000 for detecting unavailable VDI. The example method 1000 can be executed, performed, or otherwise carried out by one or more components of the system 300 (e.g., device 308, workspace service 312, or server 320, etc.), the computer 101, the cloud computing environment 214, or any other computing devices described herein in conjunction with FIGS. 1A-2C. The method 1000 can include a device identifying data of historical action, at step 1005. At step 1010, the device can identify an operation condition of a machine. At step 1015, the device can determine whether the machine is in an inoperative state. At step 1020, the device can determine to use a sequence of actions. At step 1025, the device can initiate the sequence of actions. At step 1030, the device can determine whether the machine is in an operable state. At step 1035, the device can initiate a reboot on the machine. For the purposes of providing examples, the logical operations discussed in steps 1005-1035 can be performed by the device 308 or other components in conjunction with at least FIG. 3.

Still referring to FIG. 10 in further detail, at step 1005, the device can the device can identify data associated with a history of actions performed on various machines. In some cases, the data may be a history of actions performed by the machines. The device can identify the data from various different sources, such as from a server, analytics service, VAD database, local storage of the device, the cloud, or other remote data repositories. The data can include at least one of CPU, RAM, disk usage, resource spikes, process, load evaluator index, session count, state, or status of individual machines. The device can receive or obtain the data from the database. In some cases, the device can update the data stored or maintained in the database. For instance, the device can receive an updated data or new data from a machine or a remote device. The device can transmit the data to the database to store, replace existing data, or modify the existing data. The device can obtain, identify, update, or otherwise manage the historical data similar to at least step 905.

At step 1010, the device can identify an operation condition of a machine. The device can identify the operation condition of the machine based on the data from various different data sources. The operation condition of the machine can include or correspond to a state, performance, or mode of the machine. The device can determine the mode associated with the machine, such as maintenance mode or session sharing mode. The device can determine any available VDA for the machine to launch a session for the user. The device can determine whether the session is running on the machine. The device can determine the power state of the machine or other states of the machine based on the data from the data sources.

At step 1015, the device can determine whether the machine is in an inoperative state. For example, the device can determine whether the machine is in maintenance mode, in an unusable state, or whether a session is executing on the machine (e.g., for a dedicated machine or a single session machine). The device can determine that the machine is in an inoperative state if the machine is in maintenance mode, in an unusable state, or a session is already running on the machine. The device can determine other states or conditions of the machine, such as whether session sharing is disabled or whether there is an available VDA, for example. If the machine is inoperable, the device can proceed to step 1020. Otherwise, the device can proceed to step 1005 to analyze other machines.

At step 1020, the device can determine to use a sequence of actions. The sequence of actions can include at least switching maintenance mode (e.g., maintenance mode on or maintenance mode off), rebooting the machine, start the machine (e.g., power on), or performing logoff action. Further, the device can transmit messages or alert the administrator or the user prior to or responsive to initiating the sequence of action. The device can determine or select the sequence of actions based on the condition of the machine. For instance, the device can determine to switch maintenance mode based on the state of the maintenance mode of the machine. The device can determine to use a power action (e.g., power on or initiate the machine) based on the power state of the machine. The device can determine to logoff an existing session on the machine based on receiving a request to initiate a new session from the user. In some cases, the device can determine to logoff the existing session in response to determining that the session is stale (e.g., zombie session) based on the activities or lack of activities on the session.

At step 1025, the device can initiate the sequence of actions. The device can initiate the sequence of actions in response to selecting or determining the type of action to initiate based on the condition of the machine. For instance, the device can identify that the machine is in maintenance mode. The device can determine that the maintenance period is completed or the maintenance is not turned off for the machine. Accordingly, the device can switch the maintenance mode off. In some cases, if the maintenance is extended or prolonged, the device can notify the user of the ongoing maintenance without turning off the maintenance mode.

In another example, the device can determine that the machine is in an unusable state. For instance, the device can identify that the machine is powered off or is not operating. The device can perform a power action, such as turning on the machine to restore the machine to a usable or operational state. In further example, the device can determine whether a session is executing on the machine, such as in response to receiving a request to initiate a session. If there is an existing session on the machine, the device may determine to initiate a logoff action to terminate the session on the machine and launch a new session for the user.

At step 1030, the device can determine whether the machine is in an operable state. For instance, the device can switch the maintenance mode, session sharing mode, or perform power action on the machine. The device can initiate other actions on the machine based on the machine condition. Subsequent to initiating the action, the device can determine whether the machine is operational. The device can determine whether the machine is an operation based on receiving an acknowledgment or data from the machine indicating the operational condition. If the machine is in an operational state, the device can proceed to step 1005 to identify other machines with a performance issue. If the machine is still not operational after initiating the sequence of actions, the device can proceed to step 1035.

At step 1035, the device can initiate a reboot on the machine. For instance, the device can initiate a reboot action for machines with unknown conditions. In some cases, the device can initiate a reboot action for the machine that is not in an operational state subsequent to initiating the sequence of actions. For instance, the machine can initiate a power action or a maintenance mode switch action on the machine. The power action can turn on the machine. The maintenance mode switch action can turn off the maintenance mode of the machine. The device can determine that the previous sequence of actions does not restore the machine to an operational state. Accordingly, the device can proceed to initiate a reboot on the machine. The device can notify the administrator or the user of the operations performed by the device. In some cases, if the machine is not operable after initiating the reboot, the device can alert the administrator to perform one or more actions. The device can proceed back to step 1005 to identify the operation conditions of other machines.

Further Example Embodiments

The following examples pertain to further embodiments, from which numerous permutations and configurations will be apparent.

Example 1 includes a method including identifying, by one or more processors coupled to memory, data associated with a history of actions performed on a plurality of machines; determining, by the one or more processors using the data, a change in performance of the plurality of machines if a sequence of actions were applied to one or more of the plurality of machines; selecting, by the one or more processors, a machine of the plurality of machines based on at least on the change in performance of the machine satisfying a threshold; and initiating, by the one or more processors responsive to the selection, the sequence of actions on the machine.

Example 2 includes the subject matter of Example 1, further comprising: determining, by the one or more processors, a second change in performance of the machine subsequent to initiation of the sequence of actions; receiving, by the one or more processors, feedback from the machine; and updating, by the one or more processors, the data associated with the plurality of machines based on the second change in performance and the feedback.

Example 3 includes the subject matter of any of Examples 1 and 2, further comprising: generating, by the one or more processors, a list comprising one or more machines of the plurality of machines based on the change in performance of the one or more machines satisfying the threshold, and wherein selecting the machine comprises selecting, by the one or more processors, at least one machine from the list.

Example 4 includes the subject matter of any of Examples 1 through 3, further comprising: updating, by the one or more processors, the list comprising the one or more machines subsequent to initiation of the sequence of actions on the machine; selecting, by the one or more processors, a second machine from the updated list; and initiating, by the one or more processors responsive to the selection of the second machine, the sequence of actions on the second machine.

Example 5 includes the subject matter of any of Examples 1 through 4, further comprising: receiving, by the one or more processors, feedback data from a remote device subsequent to initiating the sequence of actions; generating, by the one or more processors, a rule set for the plurality of machines based on the feedback data from the remote device; selecting, by the one or more processors, a second machine of the plurality of machines based on the change in performance of the second machine satisfying the threshold and the rule set; and initiating, by the one or more processors responsive to the selection of the second machine, a second sequence of actions on the second machine based at least on the rule set, the second sequence of actions different from the sequence of actions.

Example 6 includes the subject matter of any of Examples 1 through 5, wherein the sequence of actions comprises: switching, by the one or more processors, a state of the machine to maintenance mode; terminating, by the one or more processors, one or more sessions established on the machine; and executing, by the one or more processors, a reboot on the machine.

Example 7 includes the subject matter of any of Examples 1 through 6, further comprising: identifying, by the one or more processors using the data associated with the history of actions performed on the plurality of machines, a second machine having an inoperative state, the inoperative state comprising at least one of an unknown state, an invalid state, or a stale state; determining, by the one or more processors based on the data associated with the history of actions, that the sequence of actions restore the second machine to an operable state; and initiating, by the one or more processors in response to the determination, the sequence of actions on the second machine.

Example 8 includes the subject matter of any of Examples 1 through 7, wherein the sequence of actions comprises at least one of: disabling, by the one or more processors, maintenance mode of the machine; initiating, by the one or more processors, a power action on the machine;
enabling, by the one or more processors, a session sharing mode for the machine;
terminating, by the one or more processors, a session of the machine; or initiating, by the one or more processors, a reboot on the machine.

Example 9 includes the subject matter of any of Examples 1 through 8, wherein determining the change in performance further comprises: determining, by the one or more processors, the change in performance of the plurality of machines responsive to the sequence of actions on the one or more of the plurality of machines; determining, by the one or more processors, a second change in performance of the plurality of machines responsive to a second sequence of actions on the one or more of the plurality of machines.

Example 10 includes the subject matter of any of Examples 1 through 9, further comprising: determining, by the one or more processors, that at least one of the change in performance or the second change in performance of the one or more of the plurality of machines satisfy the threshold; and selecting, by the one or more processors, the machine and a second machine of the plurality of machines based at least on the change in performance or the second change in performance of the machine and the second machine satisfying the threshold.

Example 11 includes the subject matter of any of Examples 1 through 10, further comprising: determining, by the one or more processors, that the change in performance is greater than the second change in performance on the machine; initiating, by the one or more processors responsive to the determination, the sequence of actions on the machine; determining, by the one or more processors, that the second change in performance is greater than the change in performance on the second machine; and initiating, by the one or more processors responsive to the determination, the second sequence of actions on the second machine.

Example 12 includes the subject matter of any of Examples 1 through 11, further comprising: determining, by the one or more processors using the data associated with the plurality of machines, a timeframe that performance of at least one of the plurality of machines is below a second threshold; and initiating, by the one or more processors responsive to the determination, the sequence of actions on the at least one of the plurality of machines prior to or during the timeframe.

Example 13 includes the subject matter of any of Examples 1 through 12, wherein the data comprises at least one of central processing unit (CPU), random-access memory (RAM), disk usage, resource spikes, process, load evaluator index, session count, state, or status of each of the plurality of machines, and wherein the method further comprises: generating, by the one or more processors, a metric using the data associated with the plurality of machines; and wherein determining the change in performance comprises determining, by the one or more processors using the metric, the change in performance of the plurality of machines responsive to the sequence of actions on the one or more of the plurality of machines.

Example 14 includes a system including one or more processors coupled to memory, configured to: identify data associated with a history of actions performed on a plurality of machines; determine, using the data, a change in performance of the plurality of machines if a sequence of actions were applied to one or more of the plurality of machines; select a machine of the plurality of machines based on at least on the change in performance of the machine satisfying a threshold; and initiate, responsive to the selection, the sequence of actions on the machine.

Example 15 includes the subject matter of Example 14, wherein the one or more processors are further configured to: determine a second change in performance of the machine subsequent to initiation of the sequence of actions; receive feedback data from the machine; and update the data associated with the plurality of machines based on the second change in performance and the feedback data.

Example 16 includes the subject matter of any of Examples 14 and 15, wherein the one or more processors further configured to: receive feedback data from a remote device subsequent to initiation of the sequence of actions; generate a rule set for the plurality of machines based on the feedback data from the remote device; select a second machine of the plurality of machines based on the change in performance of the second machine satisfying the threshold and the rule set; and initiate, responsive to the selection of the second machine, a second sequence of actions on the second machine based on the rule set, the second sequence of actions different from the sequence of actions.

Example 17 includes the subject matter of any of Examples 14 through 16, wherein responsive to initiation of the sequence of actions, the one or more processors are configured to: switch a state of the machine to maintenance mode; terminate one or more sessions established on the machine; and execute a reboot on the machine.

Example 18 includes the subject matter of any of Examples 14 through 17, wherein the sequence of actions comprises at least one of: disable maintenance mode of the machine; initiate a power action on the machine; enable a session sharing mode for the machine; terminate a session of the machine; or initiate a reboot on the machine.

Example 19 includes the subject matter of any of Examples 14 through 18, wherein the data comprises at least one of central processing unit (CPU), random-access memory (RAM), disk usage, resource spikes, process, load evaluator index, session count, state, or status of each of the plurality of machines, and wherein the one or more processors further configured to: generate a metric using the data associated with the plurality of machines; and wherein to determine the change in performance comprises determine, using the metric, the change in performance of the plurality of machines responsive to the sequence of actions on the one or more of the plurality of machines.

Example 20 includes a non-transitory computer readable storage medium storing instructions that, when executed by one or more processors, cause the one or more processors to: identify data associated with a history of actions performed on a plurality of machines; determine, using the data, a change in performance of the plurality of machines if a sequence of actions were applied to one or more of the plurality of machines; select a machine of the plurality of machines based on at least on the change in performance of the machine satisfying a threshold; and initiate, responsive to the selection, the sequence of actions on the machine.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method, comprising:
    identifying, by one or more processors coupled to memory, data associated with a history of actions performed on a plurality of machines;
    predicting, by the one or more processors using the data and based on a simulation of a sequence of actions, a future change in performance of the plurality of machines if the sequence of actions were applied to one or more of the plurality of machines;
    selecting, by the one or more processors and based on the simulation, a machine of the plurality of machines based at least on the change in performance of the machine satisfying a threshold, wherein the threshold is a numerical percentage that corresponds to an increase in performance associated with the machine; and
    prior to the future change in performance, initiating, by the one or more processors responsive to the selection, the sequence of actions on the machine.

2. The method of claim 1, further comprising:
    determining, by the one or more processors, a second change in performance of the machine subsequent to initiation of the sequence of actions;
    receiving, by the one or more processors, feedback from the machine; and
    updating, by the one or more processors, the data associated with the plurality of machines based on the second change in performance and the feedback.

3. The method of claim 1, further comprising:
    generating, by the one or more processors, a list comprising one or more machines of the plurality of machines based on the change in performance of the one or more machines satisfying the threshold, and
    wherein selecting the machine comprises selecting, by the one or more processors, at least one machine from the list.

4. The method of claim 3, further comprising:
    updating, by the one or more processors, the list comprising the one or more machines subsequent to initiation of the sequence of actions on the machine;

selecting, by the one or more processors, a second machine from the updated list; and initiating, by the one or more processors responsive to the selection of the second machine, the sequence of actions on the second machine.

5. The method of claim 1, further comprising:

receiving, by the one or more processors, feedback data from a remote device subsequent to initiating the sequence of actions;

generating, by the one or more processors, a rule set for the plurality of machines based on the feedback data from the remote device;

selecting, by the one or more processors, a second machine of the plurality of machines based on the change in performance of the second machine satisfying the threshold and the rule set; and initiating, by the one or more processors responsive to the selection of the second machine, a second sequence of actions on the second machine based at least on the rule set, the second sequence of actions different from the sequence of actions.

6. The method of claim 1, wherein the sequence of actions comprises:

switching, by the one or more processors, a state of the machine to maintenance mode;

terminating, by the one or more processors, one or more sessions established on the machine; and executing, by the one or more processors, a reboot on the machine.

7. The method of claim 1, further comprising:

identifying, by the one or more processors using the data associated with the history of actions performed on the plurality of machines, a second machine having an inoperative state, the inoperative state comprising at least one of an unknown state, an invalid state, or a stale state;

determining, by the one or more processors based on the data associated with the history of actions, that the sequence of actions restore the second machine to an operable state; and initiating, by the one or more processors in response to the determination, the sequence of actions on the second machine.

8. The method of claim 1, wherein the sequence of actions comprises at least one of:

disabling, by the one or more processors, maintenance mode of the machine;

initiating, by the one or more processors, a power action on the machine;

enabling, by the one or more processors, a session sharing mode for the machine;

terminating, by the one or more processors, a session of the machine; or initiating, by the one or more processors, a reboot on the machine.

9. The method of claim 1, wherein determining the change in performance further comprises:

determining, by the one or more processors, the change in performance of the plurality of machines responsive to the sequence of actions on the one or more of the plurality of machines;

determining, by the one or more processors, a second change in performance of the plurality of machines responsive to a second sequence of actions on the one or more of the plurality of machines.

10. The method of claim 9, further comprising:

determining, by the one or more processors, that at least one of the change in performance or the second change in performance of the one or more of the plurality of machines satisfy the threshold; and selecting, by the one or more processors, the machine and a second machine of the plurality of machines based at least on the change in performance or the second change in performance of the machine and the second machine satisfying the threshold.

11. The method of claim 10, further comprising:

determining, by the one or more processors, that the change in performance is greater than the second change in performance on the machine;

initiating, by the one or more processors responsive to the determination, the sequence of actions on the machine;

determining, by the one or more processors, that the second change in performance is greater than the change in performance on the second machine; and initiating, by the one or more processors responsive to the determination, the second sequence of actions on the second machine.

12. The method of claim 1, further comprising:

determining, by the one or more processors using the data associated with the plurality of machines, a timeframe that performance of at least one of the plurality of machines is below a second threshold; and initiating, by the one or more processors responsive to the determination, the sequence of actions on the at least one of the plurality of machines prior to or during the timeframe.

13. The method of claim 1, wherein the data comprises at least one of central processing unit (CPU), random-access memory (RAM), disk usage, resource spikes, process, load evaluator index, session count, state, or status of each of the plurality of machines;

wherein the method further comprises generating, by the one or more processors, a metric using the data associated with the plurality of machines; and wherein determining the change in performance comprises determining, by the one or more processors using the metric, the change in performance of the plurality of machines responsive to the sequence of actions on the one or more of the plurality of machines.

14. A system, comprising:

one or more processors, coupled to memory, configured to:

identify data associated with a history of actions performed on a plurality of machines;

predict, using the data and based on a simulation of a sequence of actions, a future change in performance of the plurality of machines if the sequence of actions were applied to one or more of the plurality of machines;

select a machine of the plurality of machines based on at least on the simulation and the change in performance of the machine satisfying a threshold, wherein the threshold is a numerical percentage that corresponds to an increase in performance associated with the machine; and prior to the future change in performance, initiate, responsive to the selection, the sequence of actions on the machine.

15. The system of claim 14, wherein the one or more processors are further configured to:

determine a second change in performance of the machine subsequent to initiation of the sequence of actions;

receive feedback data from the machine; and update the data associated with the plurality of machines based on the second change in performance and the feedback data.

16. The system of claim 14, wherein the one or more processors further configured to:
receive feedback data from a remote device subsequent to initiation of the sequence of actions;
generate a rule set for the plurality of machines based on the feedback data from the remote device;
select a second machine of the plurality of machines based on the change in performance of the second machine satisfying the threshold and the rule set; and
initiate, responsive to the selection of the second machine, a second sequence of actions on the second machine based on the rule set, the second sequence of actions different from the sequence of actions.

17. The system of claim 14, wherein responsive to initiation of the sequence of actions, the one or more processors are configured to:
switch a state of the machine to maintenance mode;
terminate one or more sessions established on the machine; and
execute a reboot on the machine.

18. The system of claim 14, wherein the sequence of actions comprises at least one of:
disable maintenance mode of the machine;
initiate a power action on the machine;
enable a session sharing mode for the machine;
terminate a session of the machine; or
initiate a reboot on the machine.

19. The system of claim 14, wherein the data comprises at least one of central processing unit (CPU), random-access memory (RAM), disk usage, resource spikes, process, load evaluator index, session count, state, or status of each of the plurality of machines;
wherein the one or more processors further configured to generate a metric using the data associated with the plurality of machines; and
wherein to determine the change in performance comprises determining, using the metric, the change in performance of the plurality of machines responsive to the sequence of actions on the one or more of the plurality of machines.

20. A non-transitory computer readable storage medium storing instructions that, when executed by one or more processors, cause the one or more processors to:
identify data associated with a history of actions performed on a plurality of machines;
predict, using the data and based on a simulation of a sequence of actions, a future change in performance of the plurality of machines if the sequence of actions were applied to one or more of the plurality of machines;
select a machine of the plurality of machines based on at least on the simulation and the change in performance of the machine satisfying a threshold, wherein the threshold is a numerical percentage that corresponds to an increase in performance associated with the machine; and
prior to the future change in performance, initiate, responsive to the selection, the sequence of actions on the machine.

* * * * *